US012598466B2

(12) United States Patent
Luo et al.

(10) Patent No.: US 12,598,466 B2
(45) Date of Patent: Apr. 7, 2026

(54) ACCOUNT DATA SHARING METHOD AND ELECTRONIC DEVICE

(71) Applicant: Huawei Technologies Co., Ltd., Shenzhen (CN)

(72) Inventors: Meiling Luo, Shanghai (CN); Xiwen Fang, Shanghai (CN); Zongjun Yang, Shanghai (CN); Yilei Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 619 days.

(21) Appl. No.: 17/798,689

(22) PCT Filed: Nov. 2, 2020

(86) PCT No.: PCT/CN2020/125973
§ 371 (c)(1),
(2) Date: Aug. 10, 2022

(87) PCT Pub. No.: WO2021/159765
PCT Pub. Date: Aug. 19, 2021

(65) Prior Publication Data
US 2023/0125139 A1      Apr. 27, 2023

(30) Foreign Application Priority Data
Feb. 12, 2020    (CN) ......................... 202010088205.5

(51) Int. Cl.
*G06F 7/04* (2006.01)
*H04L 9/40* (2022.01)
*H04W 12/37* (2021.01)

(52) U.S. Cl.
CPC ......... *H04W 12/37* (2021.01); *H04L 63/0815* (2013.01); *H04L 63/083* (2013.01); *H04L 63/0876* (2013.01)

(58) Field of Classification Search
CPC .. H04W 12/37; H04L 63/0815; H04L 63/083; H04L 63/0876; H04L 9/3226; H04L 63/0838; G06F 21/31; G06F 21/44
See application file for complete search history.

(56) References Cited

U.S. PATENT DOCUMENTS

| 11,989,400 B2 * | 5/2024 | Hu ...................... G06F 3/04845 |
| 2010/0250929 A1 * | 9/2010 | Schultz ................. H04L 63/123 |
| | | 713/168 |

(Continued)

FOREIGN PATENT DOCUMENTS

| CN | 101351022 A | 1/2009 |
| CN | 104967596 A | 10/2015 |

(Continued)

OTHER PUBLICATIONS

Kiljan et al, What You Enter Is What You Sign: Input Integrity in an Online Banking Environment, Jul. 18, 2014, IEEE, pp. 40-47. (Year: 2014).*

(Continued)

*Primary Examiner* — Philip J Chea
*Assistant Examiner* — Jenise E Jackson
(74) *Attorney, Agent, or Firm* — Conley Rose, P.C.

(57) ABSTRACT

After a first device logs in to a first account in a first application, the first receives a first operation performed by a user on the first application. Login information of the first account includes the first account, or the first account and a login password of the first account. The first device displays, in response to the first operation, a first interface including one or more device options. Each device option corresponds to one wireless device found by the first device. The first device sends, in response to a selection operation performed by the user on a first device option on the first interface, identity information of the first application and the login (Continued)

information of the first account to a second device corresponding to the first device option.

14 Claims, 27 Drawing Sheets

(56) References Cited

U.S. PATENT DOCUMENTS

| 2013/0160104 A1* | 6/2013 | Carlson | G06F 21/31 |
| | | | 726/7 |
| 2014/0324700 A1* | 10/2014 | Zhang | G06Q 20/40 |
| | | | 705/44 |
| 2015/0188915 A1* | 7/2015 | Li | G06F 21/36 |
| | | | 705/44 |
| 2015/0271163 A1* | 9/2015 | Greenspan | H04L 63/18 |
| | | | 713/168 |
| 2015/0350106 A1* | 12/2015 | Whalley | H04W 4/00 |
| | | | 709/225 |
| 2016/0087962 A1* | 3/2016 | Cao | G06F 21/00 |
| | | | 726/7 |
| 2016/0212112 A1* | 7/2016 | Liao | H04L 63/0815 |
| 2016/0261473 A1 | 9/2016 | Gupta et al. | |
| 2016/0285633 A1* | 9/2016 | Allinson | H04L 63/0853 |
| 2018/0109517 A1* | 4/2018 | Fusenig | G06F 21/43 |
| 2018/0309744 A1* | 10/2018 | Chou | H04L 63/18 |
| 2018/0324209 A1* | 11/2018 | Zhang | H04L 67/563 |

| 2019/0197231 A1* | 6/2019 | Meier | H04L 63/0407 |
| 2019/0372949 A1 | 12/2019 | Sanciangco et al. | |
| 2019/0372989 A1 | 12/2019 | Shultz et al. | |
| 2020/0065471 A1* | 2/2020 | Peng | G06N 3/08 |
| 2020/0226605 A1* | 7/2020 | Walters | G06Q 20/4015 |
| 2022/0124100 A1 | 4/2022 | Yang | |

FOREIGN PATENT DOCUMENTS

| CN | 105208013 A | 12/2015 |
| CN | 105306577 A | 2/2016 |
| CN | 108365958 A | 8/2018 |
| CN | 109508527 A | 3/2019 |
| CN | 109788005 A | 5/2019 |
| CN | 109818922 A | 5/2019 |
| CN | 110336720 A | 10/2019 |
| CN | 110598385 A | 12/2019 |
| CN | 110602216 A | 12/2019 |
| CN | 110719319 A | 1/2020 |
| CN | 113259301 B | 2/2023 |
| WO | 2015050890 A1 | 4/2015 |

OTHER PUBLICATIONS

Haron et al, User Behavior and Interactions for Multimodal Authentication, Dec. 14, 2016, IEEE, pp. 1-8. (Year: 2016).*
"PCI Express Base Specification Revision 5.0, Version 1.0," May 22, 2019, 1299 pages.

* cited by examiner

Electronic device 200

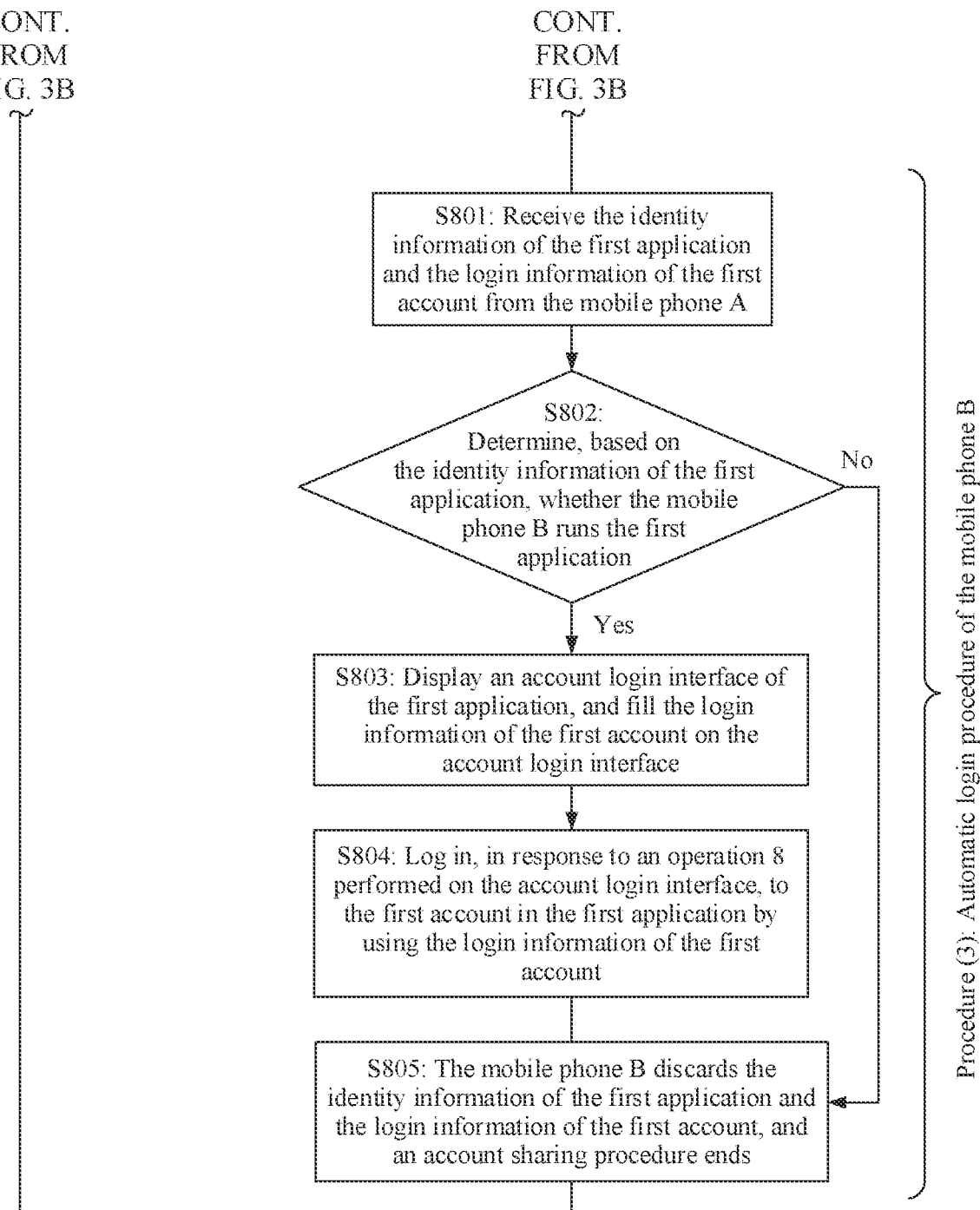

S801: Receive the identity information of the first application and the login information of the first account from the mobile phone A S802: Determine, based on the identity information of the first application, whether the mobile phone B runs the first application No Yes S803: Display an account login interface of the first application, and fill the login information of the first account on the account login interface S804: Log in, in response to an operation 8 performed on the account login interface, to the first account in the first application by using the login information of the first account S805: The mobile phone B discards the identity information of the first application and the login information of the first account, and an account sharing procedure ends Procedure (3): Automatic login procedure of the mobile phone B

FIG. 3C

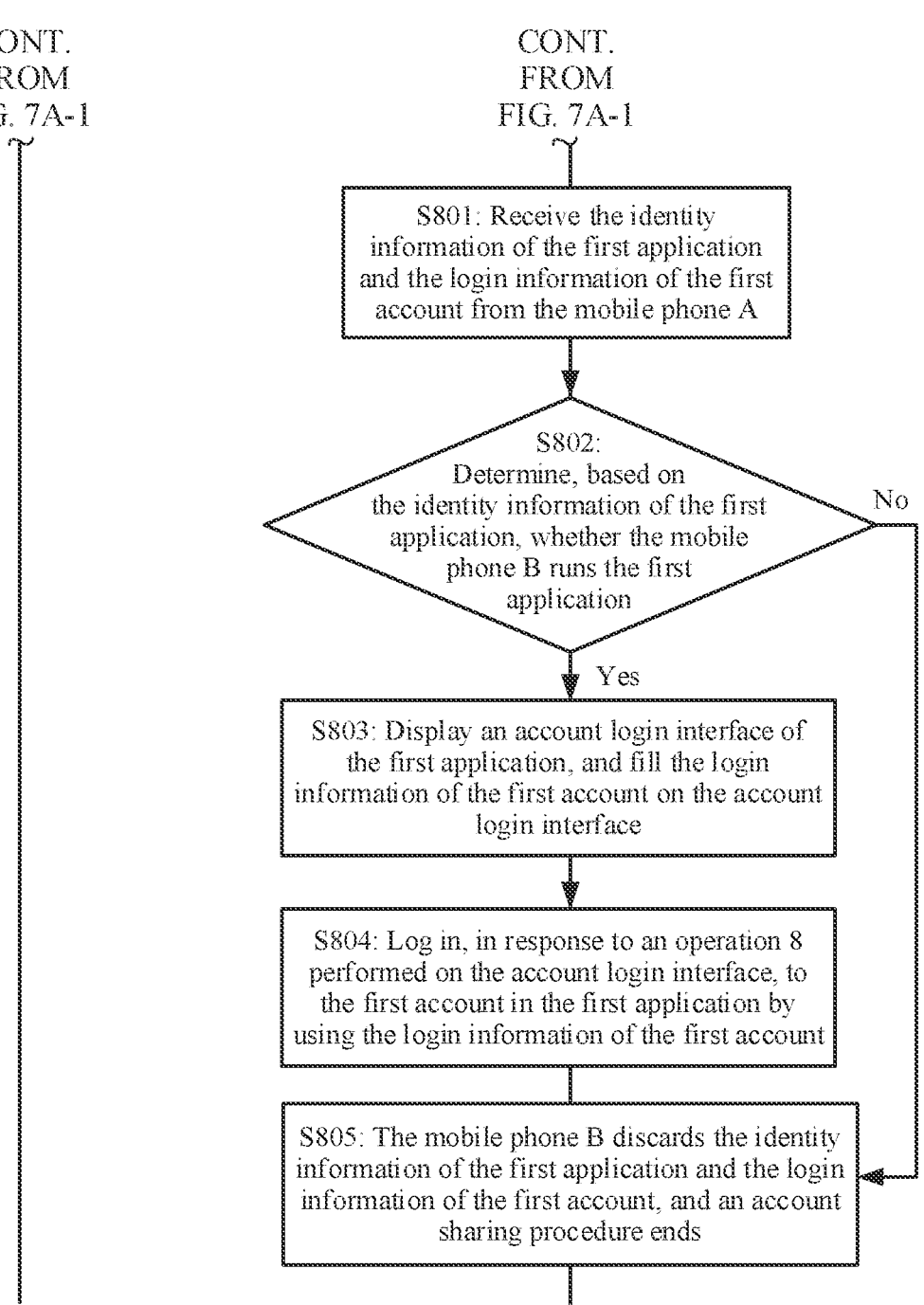

CONT.
FROM
FIG. 7A-1

CONT.
FROM
FIG. 7A-1

S801: Receive the identity information of the first application and the login information of the first account from the mobile phone A S802: Determine, based on the identity information of the first application, whether the mobile phone B runs the first application No Yes S803: Display an account login interface of the first application, and fill the login information of the first account on the account login interface S804: Log in, in response to an operation 8 performed on the account login interface, to the first account in the first application by using the login information of the first account S805: The mobile phone B discards the identity information of the first application and the login information of the first account, and an account sharing procedure ends

ACCOUNT DATA SHARING METHOD AND ELECTRONIC DEVICE

CROSS-REFERENCE TO RELATED APPLICATIONS

This is a U.S. National Stage of International Patent Application No. PCT/CN2020/125973 filed on Nov. 2, 2020, which claims priority to Chinese Patent Application No. 202010088205.5 filed on Feb. 12, 2020. Both of the aforementioned applications are hereby incorporated by reference in their entireties.

TECHNICAL FIELD

Embodiments of this application relate to the field of communications technologies and the field of artificial intelligence (Artificial Intelligence, AI) technologies, and in particular, to an account data sharing method and an electronic device.

BACKGROUND

With development of electronic technologies and improvement of electronic device performance, more applications can be installed in an electronic device (such as a mobile phone, a television, or a tablet computer). After starting an application and displaying a login interface of the application (for example, an application a), the electronic device may receive an account and a login password of the account that are entered by a user on the login interface. Then, the electronic device may initiate a login request to a server based on the account and the login password, to log in to the account. For example, the application a may be a shopping application, an instant messaging application, or a video application.

After logging in to one account in an application a in an electronic device 1 (for example, a mobile phone A), the user may want to log in to the account in an application a in an electronic device 2 (for example, a mobile phone B or a television). In this case, after the electronic device 2 displays a login interface of the application a, the user needs to enter a correct account and login password again to log in to the account in the electronic device 2.

However, because more applications are installed in the electronic device, it is difficult for the user to accurately memorize an account and a login password of each application. In addition, some electronic devices (for example, televisions) are limited by physical forms of the electronic devices, and consequently an account and a login password cannot be entered conveniently. Therefore, a solution for automatically sharing an account and a login password is required.

SUMMARY

Embodiments of this application provide an account data sharing method and an electronic device, to protect user information security and intelligently implement automatic sharing of account data.

According to a first aspect, this application provides an account data sharing method. The method may be applied to a first device, and a first application is installed in the first device. After logging in to a first account in the first application, the first device may receive a first operation performed by a user on the first application. The first operation is used to trigger the first device to share login information of the first account with another device. The first device may display, in response to the first operation, a first interface including one or more device options. Each device option on the first interface corresponds to one wireless device found by the first device. The first device may send, in response to a selection operation performed by the user on a first device option on the first interface, identity information of the first application and the login information of the first account to a second device corresponding to the first device option. The identity information of the first application includes a package name of the first application, and the package name of the first application is used to identify the first application. In this way, the second device may determine, based on the package name of the first application, that the login information of the first account is login information of one account of the first application.

In a first application scenario of this application, the login information of the first account includes the first account and a login password of the first account. In this application scenario, the first device logs in to the first account in the first application by using the first account and the login password of the first account.

In a second application scenario of this application, the login information of the first account includes the first account, but the login information of the first account does not include a login password of the first account. In this application scenario, the first device logs in to the first account in the first application by using the first account and a verification code. The first account may be a mobile number, an email address, or the like.

In the method provided in this application, a client and a server of any application (for example, the first application) do not need to be further developed, and the first device may share login information of the first application with the another device (for example, the second device) in response to the first operation performed by the user on the application (for example, the first application). In other words, according to the method, an electronic device may pertinently share login information of an application selected by the user with another device. This can improve information security in the electronic device.

In addition, the first device may directly share the login information of the first account with the second device, and the login information of the first account does not need to be transmitted by using the server. This can prevent the login information of the first account from being stolen on a server side, and can protect user information security.

In conclusion, according to the method in this application, the electronic device can share an account and a login password of any application in the electronic device with the another device without further developing a client and a server of the application, and the user information security can be protected. In other words, the method in this application can protect the user information security and intelligently implement automatic sharing of account data.

With reference to the first aspect, in a possible design manner, the first operation may be a preset operation performed on an icon of the first application. Before the first device receives the first operation performed by the user on the first application, the first device may display a home screen of the first device. The home screen includes the icon of the first application. The first device may receive the preset operation (that is, the first operation) performed on the icon of the first application on the home screen. For example, the first operation may be any operation such as a double-tap operation or a touch and hold operation performed by the user on the icon of the first application.

Alternatively, the first operation is a tap operation performed on a preset control in the first application. Before the first device receives the first operation performed by the user on the first application, the first device may display a preset page of the first application. The preset page includes the preset control. The preset control is used to trigger the first device to share the login information with the another device. For example, the first operation may be a tap operation performed by the user on the preset control on the preset page of the first application.

It can be understood that the user may selectively enter the first operation on any application in the first device, to trigger the first device to pertinently share login information of the application selected by the user with the another device.

With reference to the first aspect, in another possible design manner, with reference to the foregoing first application scenario, the login information of the first account includes the first account and the login password of the first account.

In the first application scenario, before the first device receives the first operation performed by the user on the first application, the first device may receive account data (including the first account and the login password of the first account) entered by the user on an account login interface of the first application, and the first device may log in, in response to a login operation performed by the user on the account login interface, to the first account in the first application by using the first account and the login password of the first account.

With reference to the first aspect, in another possible design manner, with reference to the foregoing second application scenario, the login information of the first account includes the first account but does not include the login password of the first account. For example, the first account includes at least a mobile number or an email address of the first device.

In the second application scenario, before the first device receives the first operation performed by the user on the first application, the first device may receive the first account and a first verification code that are entered by the user on an account login interface of the first application; and the first device may log in, in response to a login operation performed by the user on the account login interface, to the first account in the first application by using the first account and the first verification code.

With reference to the first aspect, in another possible design manner, with reference to the foregoing second application scenario, after the first device shares the first account with the second device, the second device still cannot directly log in to the first account. In this case, the second device may request the server of the first application to send a verification code (for example, a second verification code) to the first account. In this way, the first device may receive the second verification code from the server. The second verification code may be different from the first verification code. Then, the first device may send the second verification code to the second device. After receiving the second verification code, the second device may log in to the first account in the first application by using the first account and the second verification code.

With reference to the first aspect, in another possible design manner, after the first device logs in to the first account in the first application, the user may determine whether to save the login information of the first account. In other words, the user may determine whether to save the login information of the first account, so that the first device shares the login information with the another device in response to the first operation.

Specifically, after logging in to the first account in the first application, the first device may further display a second interface. The second interface is configured to request the user to confirm whether to save the login information of the first account. The first device may save the identity information of the first application and the login information of the first account in response to a second operation performed by the user on the second interface. In this design manner, the first device may save the login information of the first account based on selection of the user and willingness of the user. This can improve performance of interaction between the first device and the user, and improve user experience.

With reference to the first aspect, in another possible design manner, the first device may not save the identity information of the first application and the login information of the first account in response to a sixth operation performed by the user on the second interface, and the first device may display the first interface, the home screen, or the preset page of the first application.

In this design manner, the first device may save the login information of the first account based on selection of the user and willingness of the user. This can improve performance of interaction between the first device and the user, and improve user experience.

With reference to the first aspect, in another possible design manner, before sending the login information of the first account to the second device, the first device may request the user to confirm whether to share the login information of the first account with the second device. This can prevent the login information of the first account from being shared with the another device due to a misoperation of the user, and therefore can prevent the another device from obtaining the login information of the first account due to the misoperation of the user. In this way, user information security can be protected.

Specifically, that the first device sends, in response to a selection operation performed by the user on a first device option on the first interface, identity information of the first application and the login information of the first account to a second device corresponding to the first device option may include: The first device displays first hint information in response to the selection operation performed by the user on the first device option. The first hint information is used to request the user to confirm whether to share the login information of the first account with the second device. The first device sends the identity information of the first application and the login information of the first account to the second device in response to a third operation performed by the user on the first hint information.

With reference to the first aspect, in another possible design manner, to improve security of the login information of the first account and prevent the login information of the first account from being stolen during sharing, the first device may negotiate a session key with the second device. The first device may encrypt, by using the session key, data to be shared with the second device.

Specifically, that the first device sends, in response to a selection operation performed by the user on a first device option on the first interface, identity information of the first application and the login information of the first account to a second device corresponding to the first device option may include: The first device negotiates the session key with the second device in response to the selection operation performed by the user on the first device option. The first device encrypts the identity information of the first application and the login information of the first account by using the session key, to obtain encrypted data, and sends the encrypted data to the second device.

With reference to the first aspect, in another possible design manner, the identity information of the first application may further include a signature public key of the first application, the package name of the first application is used to represent the first application, and the signature public key of the first application is used to verify whether the package name of the first application is tampered with. It may be understood that, if the package name of the first application is tampered with, the second device does not log in to the first account in the first application by using the login information of the first account.

With reference to the first aspect, in another possible design manner, before the first device sends the identity information of the first application and the login information of the first account to the second device, the first device may have established a wireless connection to the second device, or may not establish a wireless connection to the second device.

For the two cases, that the first device sends, in response to a selection operation performed by the user on a first device option on the first interface, identity information of the first application and the login information of the first account to a second device may include: If the first device has established a wireless connection to the second device, the first device sends the identity information of the first application and the login information of the first account to the second device through the wireless connection in response to the selection operation performed by the user on the first device option. If the first device does not establish a wireless connection to the second device, the first device may request to establish the wireless connection to the second device in response to the selection operation performed by the user on the first device option, and send the identity information of the first application and the login information of the first account to the second device through the wireless connection after establishing the wireless connection.

With reference to the first aspect, in another possible design, to protect user information security, the first device may perform user identity authentication in response to the selection operation performed by the user on the first device option. If the user identity authentication succeeds, the first device may send the identity information of the first application and the login information of the first account to the second device.

According to a second aspect, this application provides an account data sharing method. The method is applied to a second device. The second device may receive identity information of a first application and login information of a first account of the first application from a first device. The second device displays an account login interface of the first application, and fills the login information of the first account on the account login interface. The second device may log in, in response to a fourth operation performed by a user on the account login interface, to the first account in the first application by using the login information of the first account.

In a first application scenario of this application, the login information of the first account includes the first account and a login password of the first account. In a second application scenario of this application, the login information of the first account includes the first account, but the login information of the first account does not include a login password of the first account. The identity information of the first application may include a package name of the first application, and the package name of the first application is used to identify the first application.

In the method provided in this application, a client and a server of an application (for example, the first application) do not need to be further developed, and the second device may receive the login information of the first account that is shared by the first device, and log in to the first account in the first application by using the login information of the first account. According to the method, an electronic device may pertinently share login information of an application selected by the user with another device. This can improve information security in the electronic device.

In addition, the second device may receive the login information of the first account from the first device, and the login information of the first account does not need to be transmitted by using the server. This can prevent the login information of the first account from being stolen on a server side, and can protect user information security.

In conclusion, according to the method in this application, the electronic device can share an account and a login password of any application in the electronic device with the another device without further developing a client and a server of the application, and the user information security can be protected. In other words, the method in this application can protect the user information security and intelligently implement automatic sharing of account data.

With reference to the second aspect, in a possible design manner, after the second device receives the login information of the first account, the user may determine whether to log in to the first account by using the login information. Specifically, after the second device receives the identity information of the first application and the login information of the first account from the first device, and before the second device displays the account login interface of the first application, the second device may display a third interface. The third interface is configured to request the user to confirm whether to log in to the first account by using the login information. The second device may display the account login interface in response to a fifth operation performed by the user on the third interface.

In this design manner, the second device may log in to the first account based on selection of the user and willingness of the user by using the login information. This can improve performance of interaction between the second device and the user, and improve user experience.

With reference to the second aspect, in another possible design manner, with reference to the foregoing second application scenario, the login information of the first account includes the first account but does not include the login password of the first account. In this case, the second device may request the server of the first application to send a verification code (for example, a second verification code) to the first account. The second device may log in to the first account m the first application by using the first account and the second verification code.

Specifically, that the second device logs in, in response to a fourth operation performed by a user on the account login interface, to the first account in the first application by using the login information of the first account may include: The second device may send a verification code obtaining request to the server of the first application in response to a verification code obtaining operation entered by the user on the account login interface. The verification code obtaining request includes the first account and is used to request the server to send a verification code to the first account. Then, the second device may receive the second verification code from the first device. The second verification code is a code that the second device requests the server to send to the first account. Finally, the second device may fill the second verification code on the account login interface, and log in to the first account in the first application by using the first account and the second verification code. The fourth operation includes the verification code obtaining operation.

With reference to the second aspect, in another possible design manner, before the second device displays the account login interface of the first application, the second device may determine, based on the identity information of the first application, whether the second device is running the first application. If the second device is running the first application, the second device may display the account login interface. If the second device does not run the first application, the second device may discard the identity information of the first application and the login information of the first account.

For example, that the second device is running the first application includes any one of the following cases: the second device is running the first application in the foreground; the second device is running the first application in the background; the second device is running a browser in the foreground, and the browser displays a web page of the first application; or the second device is running a browser in the background, and the browser displays a web page of the first application.

With reference to the second aspect, in another possible design manner, provided that the first application is installed in the second device, even if the second device does not run the first application, after the second device receives the identity information of the first application and the login information of the first account from the first device, the second device may automatically start the first application, and display the account login interface of the first application.

With reference to the second aspect, in another possible design manner, to protect user information security, the second device may negotiate a session key with the first device; the second device may receive encrypted data from the first device, where the encrypted data is obtained by encrypting the identity information of the first application and the login information of the first account by using the session key; and the second device may decrypt the encrypted data by using the session key, to obtain the identity information of the first application and the login information of the first account.

With reference to the second aspect, in another possible design manner, the identity information of the first application further includes a signature public key of the first application. The signature public key of the first application is used to determine whether the package name of the first application is tampered with. That the second device displays an account login interface of the first application includes: The second device determines, based on the signature public key of the first application, that the package name of the first application in the identity information of the first application is not tampered with, and the second device displays the account login interface.

It may be understood that, if the package name of the first application is tampered with, even if the second device fills the login information of the first account on an account login interface of an application corresponding to a tampered package name, the second device cannot log in to the first application or the application corresponding to the tampered package name. In other words, after the second device receives the identity information of the first application and the login information of the first account, operations of "displaying the account login interface", "filling the login information on the account login interface", and "logging in to the first account by using the login information" that are performed by the second device are all invalid. Therefore, before displaying the account login interface of the first application, the second device determines whether the package name of the first application is tampered with. This can prevent the second device from performing the foregoing invalid operations.

According to a third aspect, this application provides an account data sharing method. In the method, a first device logs in to a first account in a first application by using a first verification code, and the first device may receive a first operation performed by a first user on the first application. The first operation is used to trigger the first device to share the first account with another device. The first device may display a first interface in response to the first operation. The first interface includes one or more device options, and each device option corresponds to one wireless device found by the first device. The first device may send, in response to a selection operation performed by the first user on a first device option on the first interface, identity information of the first application and the first account to a second device corresponding to the first device option. The identity information of the first application is used to identify the first application. The second device may receive the identity information of the first application and the first account from the first device. Then, the second device displays an account login interface of the first application, and fills the first account on the account login interface. The second device may send a verification code obtaining request to a server of the first application in response to a verification code obtaining operation entered by a second user on the account login interface. The verification code obtaining request includes the first account and is used to request the server to send a verification code to the first account. The server may receive the verification code obtaining request from the second device, and send a second verification code of the first account to the first device. The first device may receive the second verification code from the server, and send the second verification code to the second device. The second device may receive the second verification code from the first device, fill the second verification code on the account login interface, and log in to the first account in the first application by using the first account and the second verification code.

The first user and the second user may be the same or may be different. After logging in to the first account in the first application by using the first account and the verification code, the first device may share the identity information of the first application and the first account with the second device in response to the first operation performed by the user on the first application. The second device may automatically request the server based on the first account to deliver the verification code. The server may send the second verification code to the first device, and the first device may forward the second verification code to the second device, so that the first device logs in to the first account in the first application based on the first account and the second verification code.

In the method provided in this application, a client and a server of any application (for example, the first application) do not need to be further developed, and the first device may share login information of the first application with the another device (for example, the second device) in response to the first operation performed by the user on the application (for example, the first application). In other words, according to the method, an electronic device may pertinently share login information of an application selected by the user with another device. This can improve information security in the electronic device.

In addition, the first device may directly share the first account and the second verification code with the second device, and the first account and the second verification code do not need to be transmitted by using the server. This can prevent the first account and the second verification code from being stolen on a server side, and can protect user information security.

In conclusion, according to the method in this application, the electronic device can share an account and a login password of any application in the electronic device with the another device without further developing a client and a server of the application, and the user information security can be protected.

With reference to the third aspect, in a possible design manner, the identity information of the first application includes a package name of the first application. Alternatively, the identity information of the first application includes a package name of the first application and a signature public key of the first application. The signature public key is used to verify whether the package name of the first application is tampered with. The package name of the first application is used to identify the first application.

Correspondingly, before the second device displays the account login interface of the first application, the method further includes: The second device determines, based on the signature public key, that the package name of the first application is not tampered with. In other words, the second device displays the account login interface of the first application only when the package name of the first application is not tampered with.

According to a fourth aspect, this application provides an electronic device. The electronic device is a first device, and the first device includes a wireless communications module, a memory, a display, and one or more processors. The wireless communications module, the memory, and the display are coupled to the processor.

The memory is configured to store computer program code, the computer program code includes computer instructions, and when the computer instructions are executed by the processor, the first device is enabled to perform the following operations: receiving a first operation performed by a user on a first application, where the first device logs in to a first account in the first application, and the first operation is used to trigger the first device to share login information of the first account with another device; displaying, in response to the first operation, a first interface including one or more device options, where each device option corresponds to one wireless device found by the first device; and sending, in response to a selection operation performed by the user on a first device option on the first interface, identity information of the first application and the login information of the first account to a second device corresponding to the first device option. The login information of the first account includes the first account, or the login information of the first account includes the first account and a login password of the first account. The identity information of the first application includes a package name of the first application, and the package name of the first application is used to identify the first application.

With reference to the fourth aspect, in a possible design manner, when the computer instructions are executed by the processor, the first device is enabled to further perform the following step: before receiving the first operation performed by the user on the first application, displaying a home screen of the first device. The home screen includes an icon of the first application, and the first operation is a preset operation performed by the user on the icon of the first application displayed on the home screen.

Alternatively, when the computer instructions are executed by the processor, the first device is enabled to further perform the following step: before receiving the first operation performed by the user on the first application, displaying a preset page of the first application. The preset page includes a preset control, and the preset control is used to trigger the first device to share the login information with the another device.

With reference to the fourth aspect, in another possible design manner, the login information of the first account includes the first account and the login password of the first account. When the computer instructions are executed by the processor, the first device is enabled to further perform the following steps: before receiving the first operation performed by the user on the first application, receiving the first account and the login password of the first account that are entered by the user on an account login interface of the first application: and logging in, in response to a login operation performed by the user on the account login interface, to the first account in the first application by using the first account and the login password of the first account.

With reference to the fourth aspect, in another possible design manner, the login information of the first account includes the first account but does not include the login password of the first account, and the first account includes at least a mobile number or an email address of the first device.

When the computer instructions are executed by the processor, the first device is enabled to further perform the following steps: before receiving the first operation performed by the user on the first application, receiving the first account and a first verification code that are entered by the user on an account login interface of the first application; and logging in, in response to a login operation performed by the user on the account login interface, to the first account in the first application by using the first account and the first verification code.

With reference to the fourth aspect, in another possible design manner, when the computer instructions are executed by the processor, the first device is enabled to further perform the following steps: after sending the identity information of the first application and the login information of the first account to the second device, receiving a second verification code from a server of the first application, where the second verification code is a code that the second device requests the server to send to the first account: and sending the second verification code to the second device, where the second verification code is used by the second device to log in to the first account in the first application.

With reference to the fourth aspect, in another possible design manner, when the computer instructions are executed by the processor, the first device is enabled to further perform the following steps: after logging in to the first account in the first application, displaying a second interface, where the second interface is configured to request the user to confirm whether to save the login information of the first account; and saving the identity information of the first application and the login information of the first account in response to a second operation performed by the user on the second interface.

With reference to the fourth aspect, in another possible design manner, when the computer instructions are executed by the processor, the first device is enabled to further perform the following steps: skipping saving the identity information of the first application and the login information of the first account in response to a sixth operation performed by the user on the second interface, and displaying the first interface.

With reference to the fourth aspect, in another possible design manner, when the computer instructions are executed by the processor, the first device is enabled to further perform the following steps: displaying first hint information in response to the selection operation performed by the user on the first device option, where the first hint information is used to request the user to confirm whether to share the login information of the first account with the second device; and sending the identity information of the first application and the login information of the first account to the second device in response to a third operation performed by the user on the first hint information.

With reference to the fourth aspect, in another possible design manner, when the computer instructions are executed by the processor, the first device is enabled to further perform the following steps: negotiating a session key with the second device in response to the selection operation performed by the user on the first device option; and encrypting the identity information of the first application and the login information of the first account by using the session key, to obtain encrypted data, and sending the encrypted data to the second device.

With reference to the fourth aspect, in another possible design manner, the identity information of the first application further includes a signature public key of the first application, and the signature public key of the first application is used to verify whether the package name of the first application is tampered with.

With reference to the fourth aspect, in another possible design manner, when the computer instructions are executed by the processor, the first device is enabled to further perform the following steps: negotiating a session key with the second device in response to the selection operation performed by the user on the first device option; and encrypting the identity information of the first application and the login information of the first account by using the session key, to obtain encrypted data, and sending the encrypted data to the second device.

According to a fifth aspect, this application provides an electronic device. The electronic device is a second device, and the second device includes a wireless communications module, a memory, a display, and one or more processors. The wireless communications module, the memory, and the display are coupled to the processor.

The memory is configured to store computer program code, the computer program code includes computer instructions, and when the computer instructions are executed by the processor, the second device is enabled to perform the following operations: receiving identity information of a first application and login information of a first account of the first application from a first device: displaying an account login interface of the first application, and filling the login information of the first account on the account login interface; and logging in, in response to a fourth operation performed by a user on the account login interface, to the first account in the first application by using the login information of the first account. The login information of the first account includes the first account, or the login information of the first account includes the first account and a login password of the first account. The identity information of the first application includes a package name of the first application, and the package name of the first application is used to identify the first application.

With reference to the fifth aspect, in a possible design manner, when the computer instructions are executed by the processor, the second device is enabled to further perform the following steps: after receiving the identity information of the first application and the login information of the first account, and before displaying the account login interface of the first application, displaying a third interface, where the third interface is configured to request the user to confirm whether to log in to the first account by using the login information; and displaying the account login interface in response to a fifth operation performed by the user on the third interface.

With reference to the fifth aspect, in another possible design manner, the login information of the first account includes the first account but does not include the login password of the first account.

When the computer instructions are executed by the processor, the second device is enabled to further perform the following steps: sending a verification code obtaining request to a server of the first application in response to a verification code obtaining operation entered by the user on the account login interface, where the verification code obtaining request includes the first account and is used to request the server to send a verification code to the first account; receiving a second verification code from the first device, where the second verification code is a code that the second device requests the server to send to the first account; and filling the second verification code on the account login interface, and logging in to the first account in the first application by using the first account and the second verification code. The fourth operation includes the verification code obtaining operation.

With reference to the fifth aspect, in another possible design manner, when the computer instructions are executed by the processor, the second device is enabled to further perform the following step: if the second device determines, based on the identity information of the first application, that the second device is running the first application, displaying the account login interface.

That the second device is running the first application includes any one of the following cases: the second device is running the first application in the foreground: the second device is running the first application in the background: the second device is running a browser in the foreground, and the browser displays a web page of the first application; or the second device is running a browser in the background, and the browser displays a web page of the first application.

With reference to the fifth aspect, in another possible design manner, when the computer instructions are executed by the processor, the second device is enabled to further perform the following steps: negotiating a session key with the first device; receiving encrypted data from the first device, where the encrypted data is obtained by encrypting the identity information of the first application and the login information of the first account by using the session key; and decrypting the encrypted data by using the session key, to obtain the identity information of the first application and the login information of the first account.

With reference to the fifth aspect, in another possible design manner, the identity information of the first application further includes a signature public key of the first application, and the signature public key of the first application is used to verify whether the package name of the first application is tampered with. When the computer instructions are executed by the processor, the second device is enabled to further perform the following steps: determining, based on the signature public key of the first application, whether the package name of the first application in the identity information of the first application is tampered with; and if the package name of the first application is not tampered with, displaying the account login interface.

With reference to the fifth aspect, in another possible design manner, when the computer instructions are executed by the processor, the second device is enabled to further perform the following steps: negotiating a session key with the first device; receiving encrypted data from the first device, where the encrypted data is obtained by encrypting the identity information of the first application and the login information of the first account by using the session key; and decrypting the encrypted data by using the session key, to obtain the identity information of the first application and the login information of the first account.

According to a sixth aspect, this application provides a chip system. The chip system may be applied to an electronic device including a wireless communications module, a memory, and a display. The chip system includes one or more interface circuits and one or more processors. The interface circuit and the processor are connected through a line. The interface circuit is configured to: receive a signal from the memory, and send the signal to the processor. The signal includes computer instructions stored in the memory. When the processor executes the computer instructions, the electronic device performs the method according to any one of the first aspect, the second aspect, and the third aspect and the possible design manners thereof.

According to a seventh aspect, this application provides a computer-readable storage medium. The computer-readable storage medium includes computer instructions. When the computer instructions are run on an electronic device, the electronic device is enabled to perform the method according to any one of the first aspect, the second aspect, and the third aspect and the possible design manners thereof.

According to an eighth aspect, this application provides a computer program product. When the computer program product runs on a computer, the computer is enabled to perform the method according to any one of the first aspect, the second aspect, and the third aspect and the possible design manners thereof.

It may be understood that, for beneficial effects that can be achieved by the electronic device according to any one of the fourth aspect and the fifth aspect and the possible design manners thereof the chip system according to the sixth aspect, the computer-readable storage medium according to the seventh aspect, and the computer program product according to the eighth aspect, refer to the beneficial effects m any one of the first aspect, the second aspect, and the third aspect and the possible design manners thereof. Details are not described herein again.

BRIEF DESCRIPTION OF DRAWINGS

FIG. 7A-1 and FIG. 7A-2 are a flowchart of another account data sharing method according to an embodiment of this application:

DESCRIPTION OF EMBODIMENTS

Figure 1:
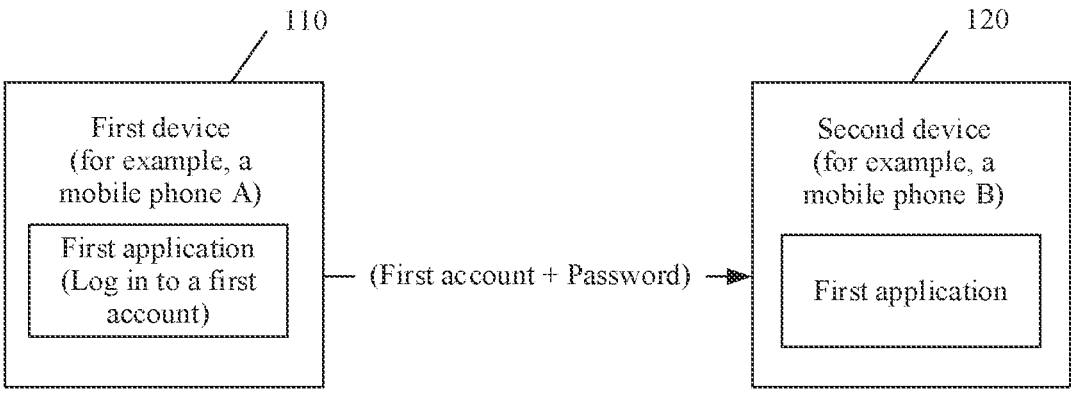
FIG. 1 is a schematic diagram of a system architecture to which an account data sharing method is applied according to an embodiment of this application.

Terms "first" and "second" below are merely intended for a purpose of description, and shall not be understood as an indication or implication of relative importance or implicit indication of a quantity of indicated technical features. Therefore, a feature limited by "first" or "second" may explicitly or implicitly include one or more such features. In the descriptions of embodiments, unless otherwise specified, "a plurality of" means two or more.

Currently, a solution for automatically sharing an account and a login password can implement automatic sharing of account data of an application (for example, an application a) between two electronic devices (for example, an electronic device 1 and an electronic device 2). In this solution, a login password storage module of the electronic device 1 (for example, a mobile phone) may save accounts and login passwords of all applications (including the application a) in the electronic device 1, a data cloning module may clone, at a time, the accounts and the login passwords of all the application that are saved in the login password storage module, and a device connection module may transmit, to the electronic device 2 (for example, a television), the accounts and the login passwords of all the application that are obtained through cloning. In this way, the electronic device 2 may automatically log in to the account of the application a by using the account and the login password of the application a.

In the foregoing solution, the electronic device 1 cannot selectively share the account and the login password of the application a with the electronic device 2. In addition, the electronic device 2 may be a public device within a specific range, and cloning the accounts and the login passwords of all the applications in the electronic device 1 to the electronic device 2 may cause leakage of a plurality of accounts and login passwords of a user.

To resolve a problem existing in the foregoing solution, another solution can implement sharing of an account and a login password between devices through in-app code scanning. Specifically, the electronic device 2 that has not logged in to an account may display a scanning interface of the application a, and the scanning interface includes a two-dimensional code of the application a. The electronic device 1 that has logged in to an account scans the two-dimensional code, and may send a login credential to the electronic device 2. The electronic device 2 may log in to an account by using the login credential.

However, only some applications currently support a function of sharing an account and a login password through in-app code scanning, and some applications do not support the function. To enable each application to support the function, clients and servers of a large quantity of applications need to be further developed, which is difficult and costly.

Embodiments of this application provide an account data sharing method. According to the method, an electronic device can share an account and a login password of any application in the electronic device with another device without further developing a client and a server of the application, and user information security can be protected.

FIG. 1 is a schematic diagram of a system architecture to which an account data sharing method is applied according to an embodiment of this application. As shown in FIG. 1, the system may include a first device 110 and a second device 120. The first device 110 may establish a wireless connection to the second device 120. The wireless connection may be any one of a wireless fidelity (wireless fidelity, Wi-Fi) connection, a Bluetooth connection, a near field communication (near field communication, NFC) technology, or the like. The Wi-Fi connection may include Wi-Fi direct, that is, a Wi-Fi peer-to-peer (peer-to-peer, P2P) connection.

A first application is installed in the first device 110. In addition, the first device 110 has logged in to a first account in the first application. It can be understood that the first device 110 may log in to the first account in the first application by using the first account and a login password. Certainly, the first application may also be installed in the second device 120. Alternatively, the second device 120 may open a web page of the first application in a browser of the second device 120.

In this embodiment of this application, the first device 110 may share the first account and the login password of the first application with the second device 120 through the wireless connection. After receiving the first account and the login password that are shared by the first device 110, the second device 120 may log in to the first account in the first application or the web page of the first application by using the first account and the login password.

For example, the first application may be any application that has an account registration and login function, such as a shopping application, an instant messaging application, or a video application.

For example, the electronic device (for example, the first device or the second device) in this embodiment of this application may be a mobile phone, a tablet computer, a smart television, a personal computer (personal computer, PC), a desktop, a laptop, a handheld computer, a notebook computer, an ultra-mobile personal computer (ultra-mobile personal computer, UMPC), a netbook, or a device such as a cellular phone, a personal digital assistant (personal digital assistant, PDA), or an augmented reality (augmented reality, AR)/virtual reality (virtual reality, VR) device. A specific form of the electronic device is not specially limited in this embodiment of this application.

It should be noted that the first device 110 and the second device 120 may be devices of different types. For example, the first device 110 is a mobile phone, and the second device 120 is a tablet computer. Alternatively, the first device 110 and the second device 120 may be devices of a same type. For example, both the first device 110 and the second device 120 are mobile phones. This is not limited in this embodiment of this application.

Figure 2:
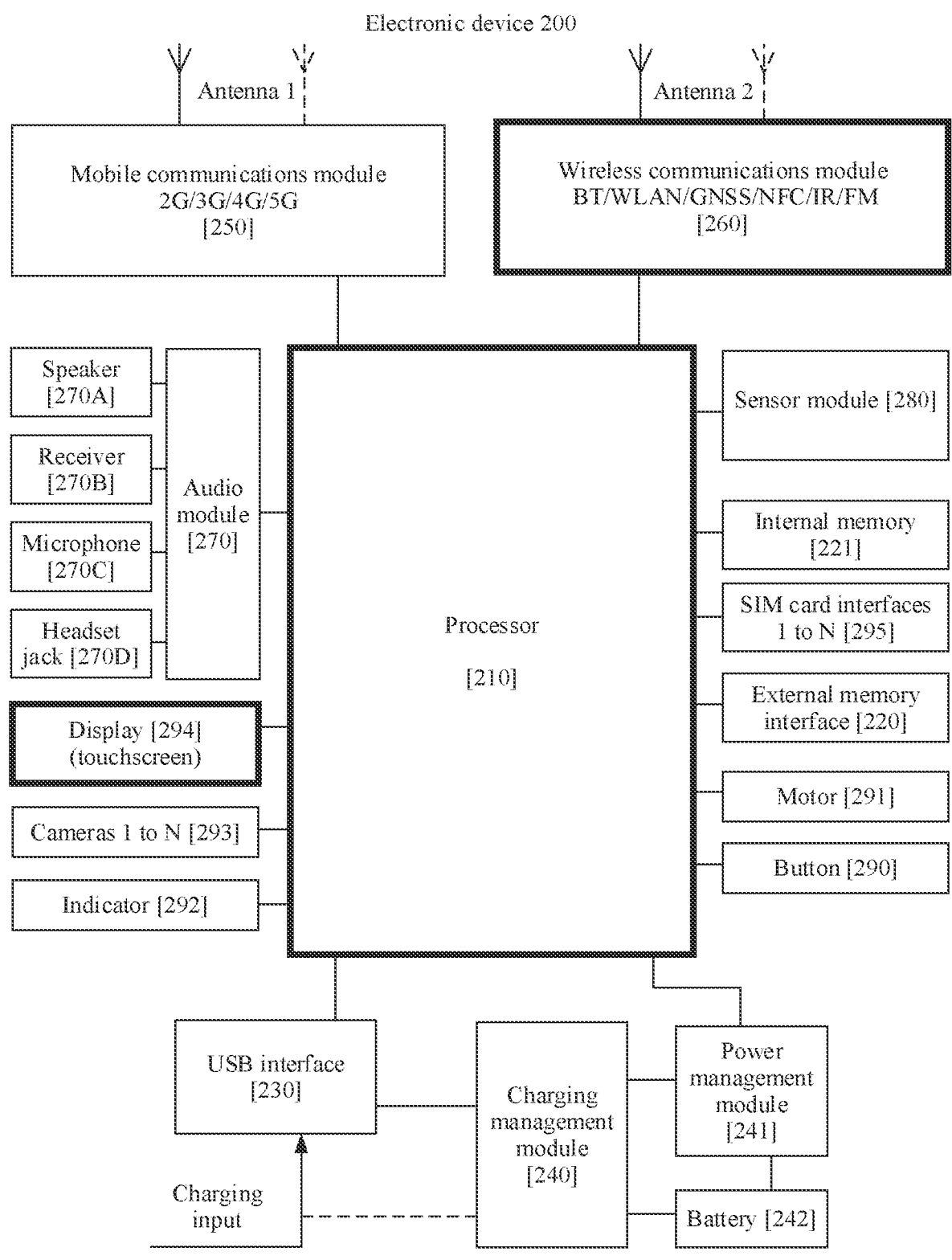
FIG. 2 is a schematic diagram of a hardware structure of an electronic device according to an embodiment of this application.

In this embodiment of this application, an example in which the first device 110 and the second device 120 shown in FIG. 1 are mobile phones is used to describe a structure of the electronic device provided in this embodiment of this application. As shown in FIG. 2, the electronic device 200 (for example, a mobile phone) may include a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identity module, SIM) card interface 295, and the like.

The sensor module 280 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

It can be understood that the structure shown in this embodiment does not constitute a specific limitation on the electronic device 200. In some other embodiments, the electronic device 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 200. The controller may generate an operation control signal based on instruction operation code and a time sequence signal, to complete control of instruction fetching and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor may directly invoke the instructions or the data from the memory. This avoids repeated access and reduces a waiting time of the processor 210, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It can be understood that an interface connection relationship between the modules shown in this embodiment is merely an example for description, and does not constitute a limitation on the structure of the electronic device 200. In some other embodiments, the electronic device 200 may alternatively use an interface connection manner different from that in the foregoing embodiment or a combination of a plurality of interface connection manners.

The charging management module 240 is configured to receive a charging input from a charger. The charger may be a wireless charger or a wired charger. When charging the battery 242, the charging management module 240 may further supply power to the electronic device by using the power management module 241.

The power management module 241 is configured to connect to the battery 242, the charging management module 240, and the processor 210. The power management module 241 receives an input of the battery 242 and/or an input of the charging management module 240, and supplies power to the processor 210, the internal memory 221, an external memory, the display 294, the camera 293, the wireless communications module 260, and the like. In some embodiments, the power management module 241 and the charging management module 240 may be alternatively disposed in a same component.

A wireless communication function of the electronic device 200 may be implemented through the antenna 1, the antenna 2, the mobile communications module 250, the wireless communications module 260, the modem processor, the baseband processor, and the like. In some embodiments, in the electronic device 200, the antenna 1 and the mobile communications module 250 are coupled, and the antenna 2 and the wireless communications module 260 are coupled, so that the electronic device 200 can communicate with a network and another device by using a wireless communications technology. For example, in this embodiment of this application, the electronic device 200 may send the first account and the login password to another device by using the wireless communications technology.

The antenna 1 and the antenna 2 are configured to transmit and receive electromagnetic wave signals. Each antenna in the electronic device 200 may be configured to cover one or more communication bands. Different antennas may be further multiplexed, to increase antenna utilization. For example, the antenna 1 may be multiplexed as a diversity antenna in a wireless local area network. In some other embodiments, the antenna may be used in combination with a tuning switch.

The mobile communications module 250 may provide a solution, applied to the electronic device 200, to wireless communication including 2G, 3G, 4G, 5G, or the like. The mobile communications module 250 may include at least one filter, a switch, a power amplifier, a low noise amplifier (low noise amplifier, LNA), and the like. The mobile communications module 250 may receive an electromagnetic wave through the antenna 1, perform processing such as filtering or amplification on the received electromagnetic wave, and transmit a processed electromagnetic wave to the modem processor for demodulation.

The mobile communications module 250 may further amplify a signal modulated by the modem processor, and convert an amplified signal into an electromagnetic wave through the antenna 1 for radiation. In some embodiments, at least some function modules in the mobile communications module 250 may be disposed in the processor 210. In some embodiments, at least some function modules in the mobile communications module 250 may be disposed in a same device as at least some modules in the processor 210.

The wireless communications module 260 may provide a solution, applied to the electronic device 200, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. For example, in this embodiment of this application, the electronic device 200 (for example, the first device 110) may access the Wi-Fi network by using the wireless communications module 260.

The wireless communications module 260 may be one or more components integrating at least one communications processing module. The wireless communications module 260 receives an electromagnetic wave through the antenna 2, performs frequency modulation and filtering processing on the electromagnetic wave signal, and sends a processed signal to the processor 210. The wireless communications module 260 may further receive a to-be-sent signal from the processor 210, perform frequency modulation and amplification on the signal, and convert a processed signal into an electromagnetic wave through the antenna 2 for radiation.

The electronic device 200 may implement a display function through the GPU, the display 294, the application processor, and the like. The GPU is a microprocessor for image processing, and is connected to the display 294 and the application processor. The GPU is configured to: perform mathematical and geometric calculation, and perform graphics rendering. The processor 210 may include one or more GPUs that execute program instructions to generate or change display information.

The display 294 is configured to display an image, a video, and the like. The display 294 includes a display panel.

For example, in this embodiment of this application, the display 294 may be configured to display an application interface of the first app, such as a device sharing interface, a device search interface, or a two-dimensional code scanning interface.

The electronic device 200 may implement a photographing function through the ISP, the camera 293, the video codec, the GPU, the display 294, the application processor, and the like. The ISP is configured to process data fed back by the camera 293. The camera 293 is configured to capture a static image or a video. In some embodiments, the electronic device 200 may include one or N cameras 293, where N is a positive integer greater than 1.

The external memory interface 220 may be configured to connect to an external memory card, for example, a micro SD card, to extend a storage capability of the electronic device 200. The external memory card communicates with the processor 210 through the external memory interface 220, to implement a data storage function. For example, files such as music and a video are stored in the external memory card.

The internal memory 221 may be configured to store computer-executable program code. The executable program code includes instructions. The processor 210 runs the instructions stored in the internal memory 221, to perform various function applications of the electronic device 200 and data processing. For example, in this embodiment of this application, the processor 210 may execute the instructions stored in the internal memory 221, and the internal memory 221 may include a program storage area and a data storage area.

The program storage area may store an operating system, an application program required by at least one function (for example, a sound playing function or an image playing function), and the like. The data storage area may store data (such as audio data and a phone book) created when the electronic device 200 is used, and the like. In addition, the internal memory 221 may include a high-speed random access memory, or may include a nonvolatile memory, for example, at least one magnetic disk storage device, a flash memory, or a universal flash storage (universal flash storage, UFS).

The electronic device 200 may implement an audio function such as music playing and recording through the audio module 270, the speaker 270A, the receiver 270B, the microphone 270C, the headset jack 270D, the application processor, and the like.

The button 290 includes a power button, a volume button, and the like. The button 290 may be a mechanical button, or may be a touch button. The motor 291 may generate a vibration prompt. The motor 291 may be configured to provide an incoming call vibration prompt or a touch vibration feedback. The indicator 292 may be an indicator light, and may be configured to indicate a charging status and a power change, or may be configured to indicate a message, a missed call, a notification, or the like. The SIM card interface 295 is configured to connect to a SIM card. The SIM card may be inserted into the SIM card interface 295 or removed from the SIM card interface 295, to implement contact with or separation from the electronic device 200. The electronic device 200 may include one or N SIM card interfaces, where N is a positive integer greater than 1. The SIM card interface 295 may support a nano-SIM card, a micro-SIM card, a SIM card, and the like.

Figure 4A:
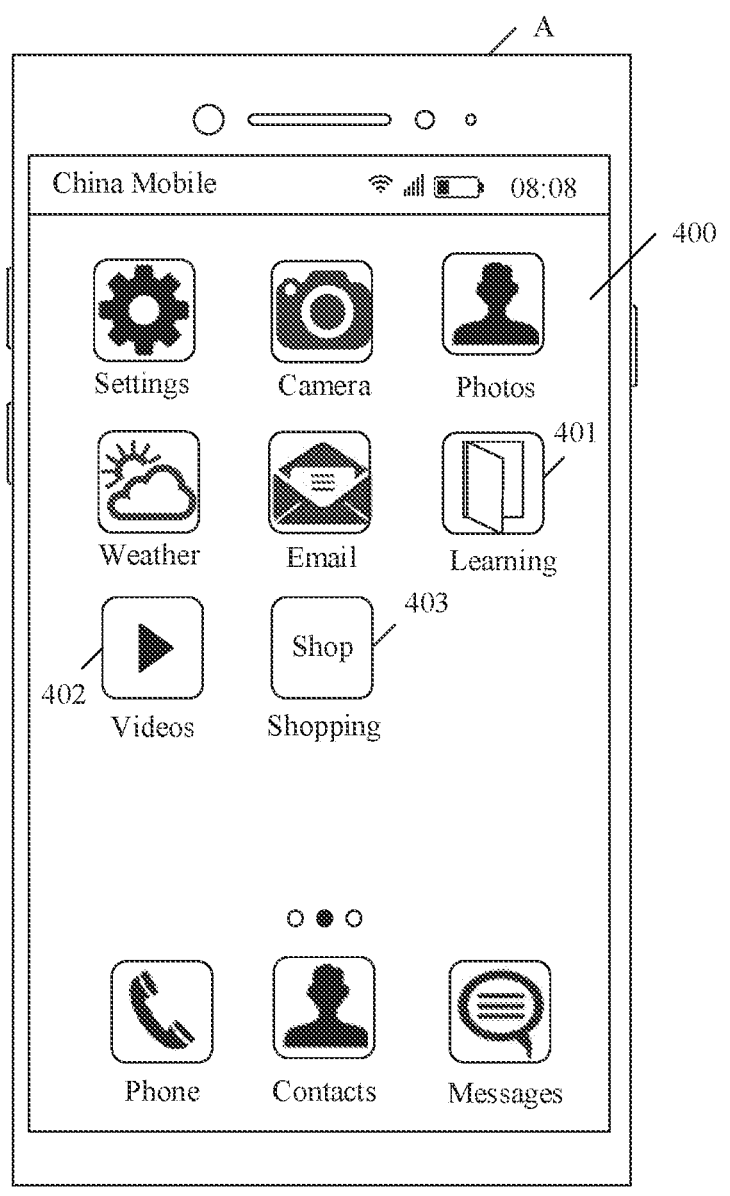
FIG. 4(*a*) to FIG. 4(*c*) are a schematic diagram of an instance of a display interface of a mobile phone according to an embodiment of this application.

For example, in this embodiment of this application, an example in which the first device 110 is a mobile phone A and the second device 120 is a mobile phone B in FIG. 1 is used to describe the method in this embodiment of this application. A first application is installed in the mobile phone A. For example, the first application may be a shopping application, a video application, an instant messaging application, or any other application that has an account registration and login function, for example, an application used for online learning. As shown in FIG. 4(*a*), a home screen (namely, a home screen) of the mobile phone A includes an icon 403 of a shopping application, an icon 402 of a video application, and an icon 401 of a learning application.

Figure 3A:
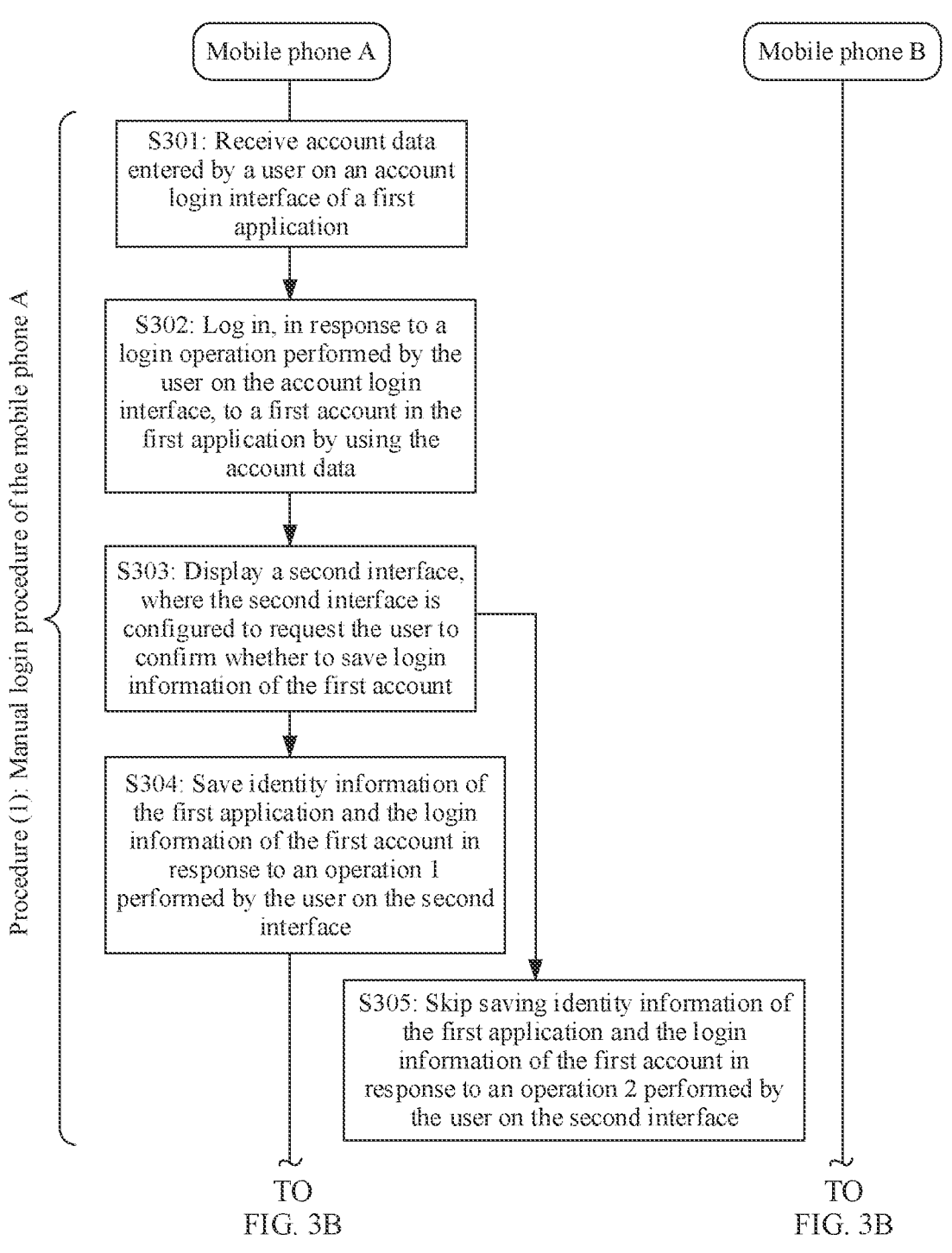
FIG. 3A and FIG. 3C are a flowchart of an account data sharing method according to an embodiment of this application.
Figure 3B:
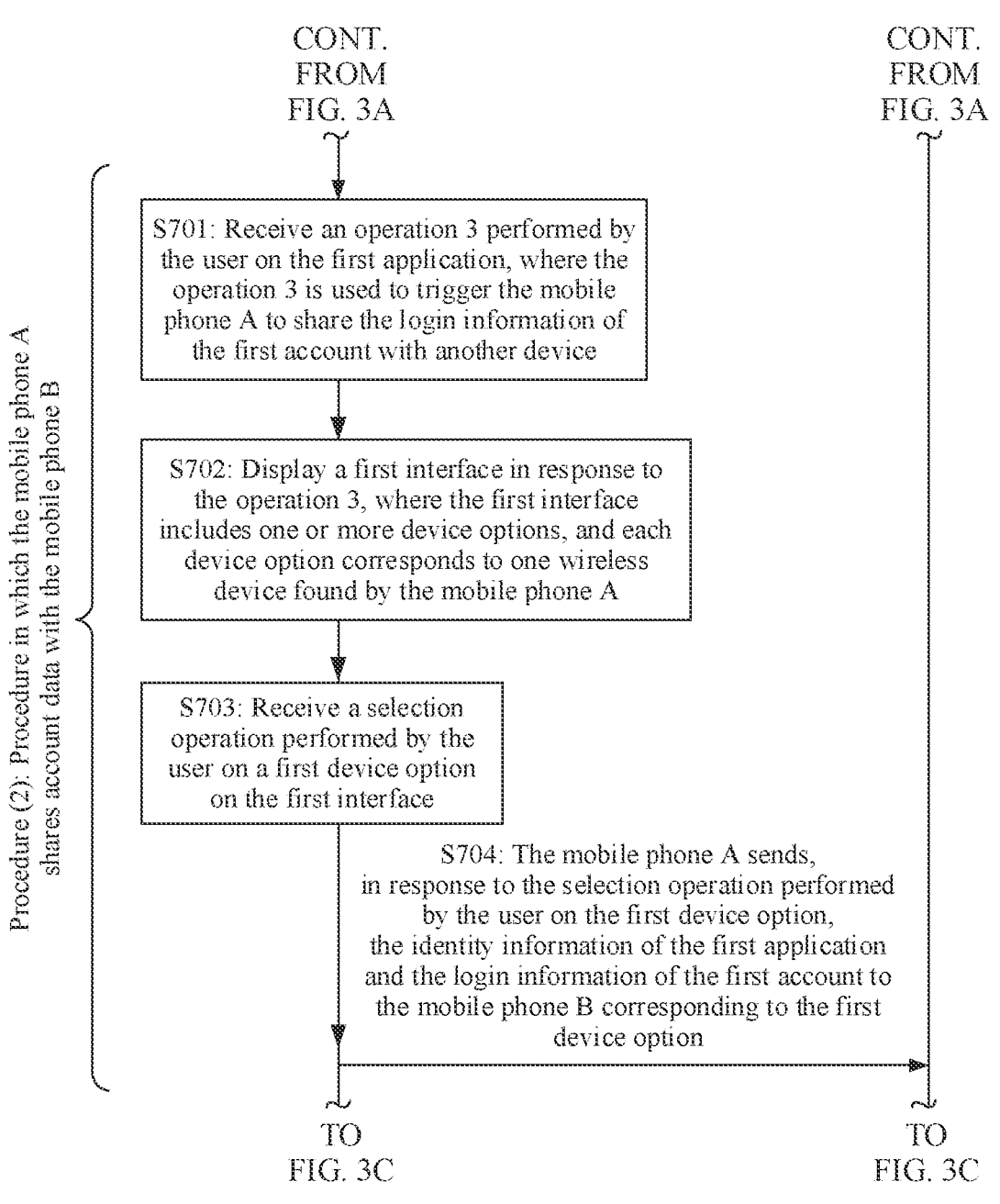

An embodiment of this application provides an account data sharing method. As shown in FIG. 3A and FIG. 3C, the method may include three procedures: a procedure (1) to a procedure (3). Procedure (1): Manual login procedure of the mobile phone A. Procedure (2): Procedure in which the mobile phone A shares account data with the mobile phone B. Procedure (3): Automatic login procedure of the mobile phone B.

As shown in FIG. 3A and FIG. 3C, the foregoing procedure (1), that is, the "manual login procedure of the mobile phone A", may include S301 to S305.

S301: The mobile phone A receives account data entered by a user on an account login interface of a first application.

In a first application scenario, the account login interface of the first application may include an "account input box" and a "login password input box". The "account input box" is used to enter an account (for example, a first account) of the first application, and the "login password input box" is used to enter a login password of the first account. In the first application scenario, the account data may include the first account and the login password of the first account.

The account login interface may further include a "Log in" button. The "Log in" button is used to trigger the mobile phone A to log in to the first account by using the first account entered in the "account input box" and the login password of the first account entered in the "login password input box". For example, the first application is a shopping application. The mobile phone A may display an account login interface 410 shown in FIG. 4(*b*). The account login interface 410 includes an "account input box" 411, a "login password input box" 412, and a "Log in" button 413.

Optionally, the account login interface of the first application may further include an "automatic save" option. The "automatic save" option is used to trigger the mobile phone A to automatically save the account entered in the "account input box" and the login password entered in the "login password input box". For example, the first application is a learning application. The mobile phone A may display an account login interface 420 shown in FIG. 4(*c*). The account login interface 420 includes an "account input box" 421, a "login password input box" 422, a "Log in" button 424, and an "automatic save" button 423.

In a second application scenario, the account login interface may include an "account input box", a "verification code input box", and an "Obtain the verification code" button. The "account input box" is used to enter an account such as a mobile number or an email address. In other words, the first account may include at least a mobile number or an email address of the mobile phone A. The "Obtain the verification code" button is used to trigger the mobile phone A to request a server of the first application to send a verification code for the account (that is, the first account, for example, the mobile number) entered in the "account input box". The "verification code input box" is used to enter the verification code sent by the server to an electronic device that uses the foregoing account (for example, the mobile number).

In the second application scenario, the account data may include the first account and the verification code. A verification code 1 is a first verification code. The verification code 1 is a code that the mobile phone A requests the server to deliver. Both the login password of the first account and the verification code 1 may be used as login credentials for logging in to the first account. However, a difference is that the verification code 1 is invalid after the mobile phone A successfully logs in to the first account in the first application; or the verification code 1 is valid within preset duration 1 (for example, 5 minutes or 10 minutes), and the verification code 1 is invalid after the preset duration 1. A start time of the preset duration 1 is a time at which the server delivers a verification code.

The account login interface may further include a "Log in" button. The "Log in" button is used to trigger the mobile phone A to log in to the first account by using the first account entered in the "account input box" and the verification code 1 entered in the "verification code input box".

For example, the first application is a video application. The mobile phone A may display an account login interface 500 of the video application shown in FIG. 5. The account login interface 500 includes an "account input box" 501, a "verification code input box" 502, an "Obtain the verification code" button 503, and a "Log in" button 504.

S302: The mobile phone A logs in, in response to a login operation performed by the user on the account login interface, to the first account in the first application by using the account data.

Figure 4B:
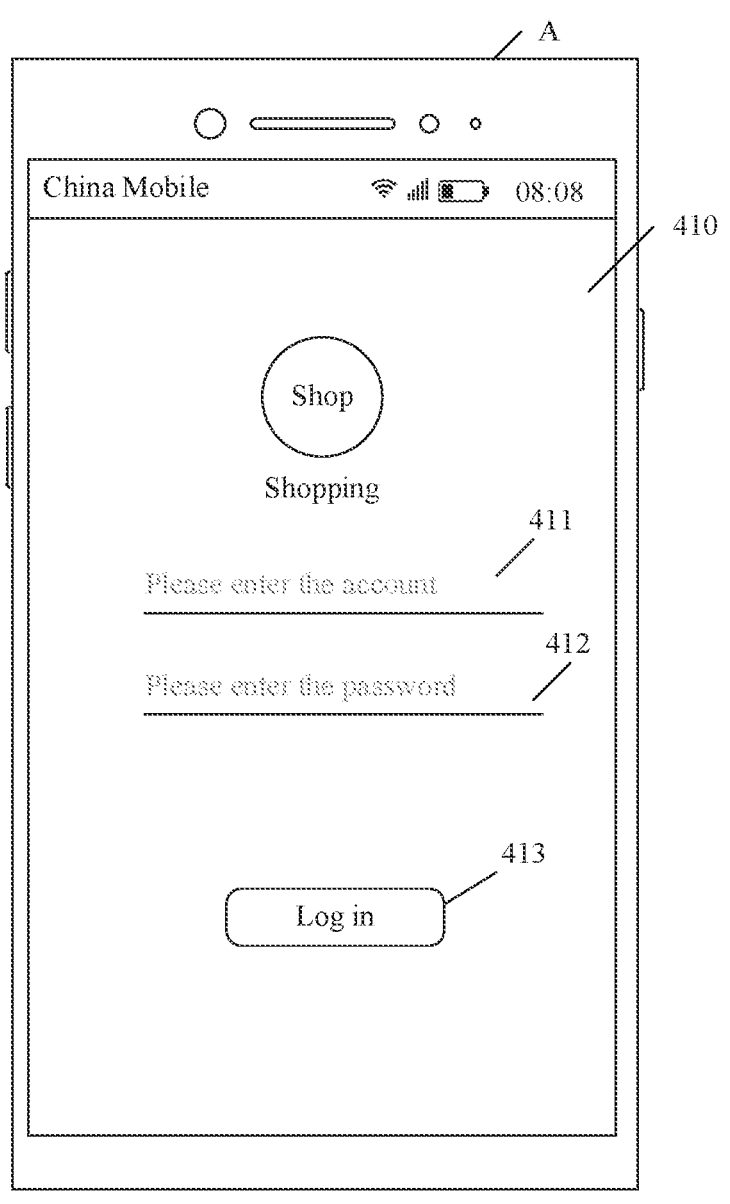
Figure 4C:
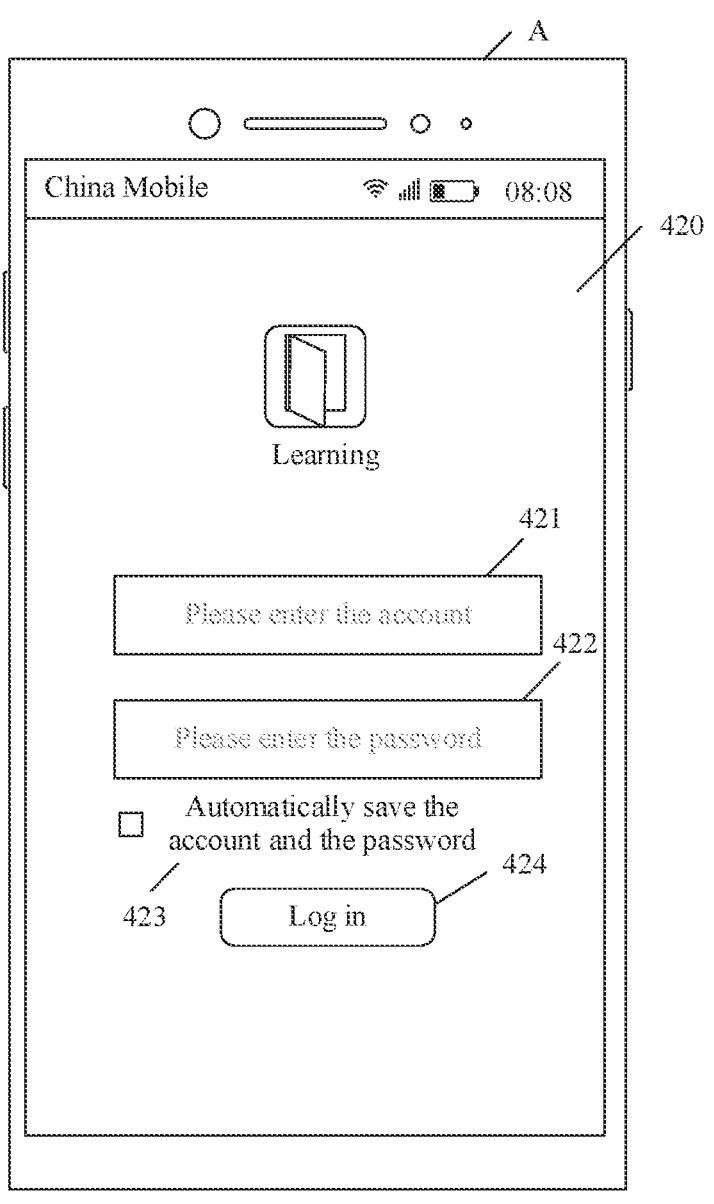
Figure 5:
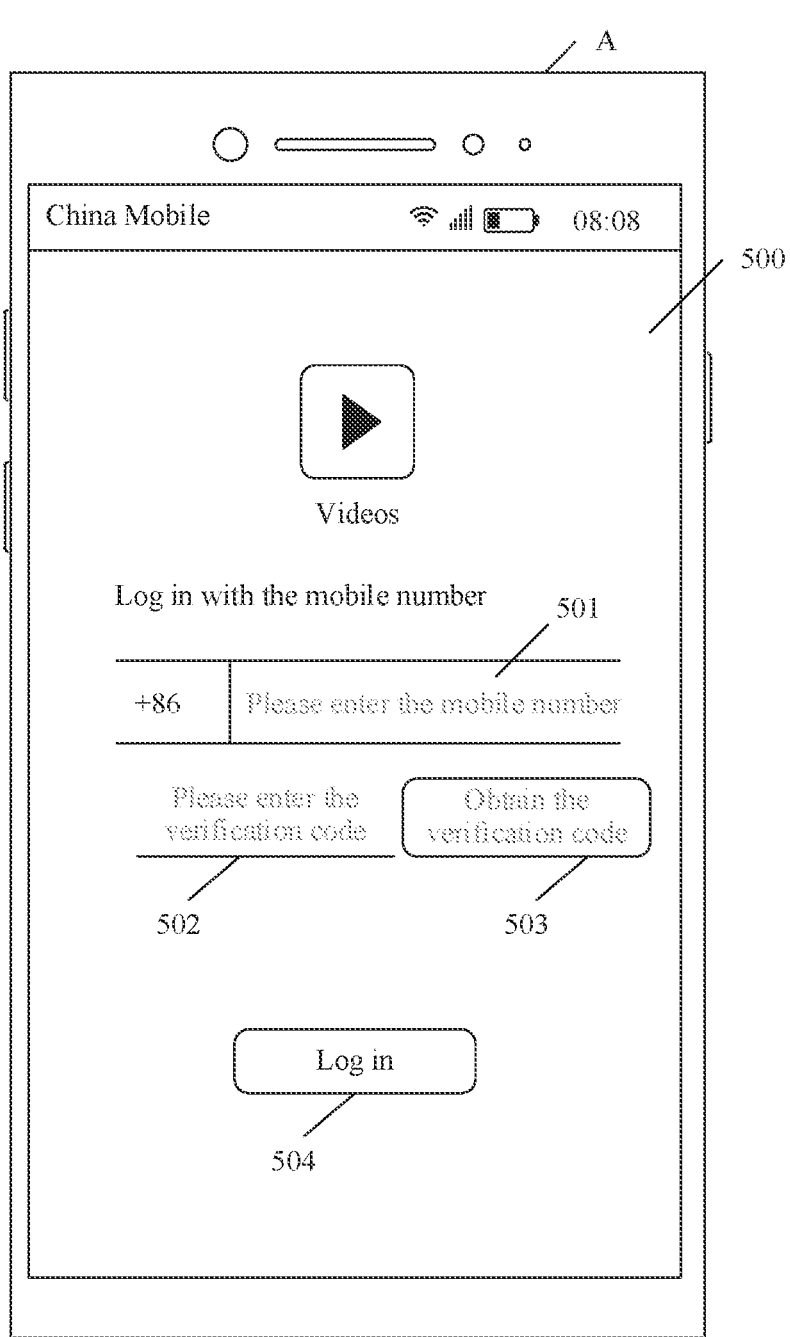
FIG. 5 is a schematic diagram of an instance of another display interface of a mobile phone according to an embodiment of this application.

For example, the login operation may be a tap operation (for example, a single-tap operation) performed by the user on the "Log in" button in FIG. 4(b), FIG. 4(c), or FIG. 5. It should be noted that, in this embodiment of this application, the method in which the mobile phone A logs in to the first account in the first application includes but is not limited to the method described in S301 and S302. For another method in which the mobile phone A logs in to the first account in the first application, refer to an application account login method in the conventional technology. Details are not described herein.

Different from the conventional technology, in this embodiment of this application, after S302, the mobile phone A may further save the first account and the login password of the first account or save the first account based on selection of the user. Specifically, after S302, the method in this embodiment of this application may further include S303.

S303: The mobile phone A displays a second interface. The second interface is configured to request the user to confirm whether to save login information of the first account.

In the first application scenario, the login information of the first account includes the first account and the login password of the first account. In other words, the second interface is configured to request the user to confirm whether to save the first account and the login password of the first account. For example, the mobile phone A may log in to the first account in response to the tap operation performed by the user on the "Log in" button shown in FIG. 4(b). For example, the first account is 180**7812. After logging in to the first account, the mobile phone A may display a second interface 610 shown in (a) in FIG. 6A. The second interface 610 may include hint information 611, for example, "Please confirm whether to save the account 180**7812 and the login password!". The second interface 610 may further include a "YES" button 612 and a "NO" button 613. The "YES" button 612 is used to trigger the mobile phone A to save the first account and the login password of the first account. The "NO" button 613 is used to indicate the mobile phone A not to save the first account and the login password of the first account. Optionally, the second interface 610 may further include hint information 614, for example, "The saved account and password can be shared with another device, and the account can be automatically logged in to on the another device!".

It can be learned from the descriptions of the foregoing embodiment that, in the first application scenario, the account login interface of the first application includes the "account input box" and the "login password input box". For example, the account login interfaces shown in FIG. 4(b) and FIG. 4(c) each include the "account input box" and the "login password input box". Optionally, the account login interface of the first application may further include the "automatic save" option. For example, the account login interface 420 shown in FIG. 4(c) includes the "automatic save" option 423.

In a case (1) of the first application scenario, regardless of whether the account login interface of the first application includes the "automatic save" option, after S302, the mobile phone A may perform S303 of displaying the second interface.

In a case (2) of the first application scenario, the account login interface of the first application includes "automatic save". In this case, regardless of whether "automatic save" is selected when the mobile phone A performs S302, after S302, the mobile phone A may perform S303 of displaying the second interface.

In a case (3) of the first application scenario, the account login interface of the first application includes "automatic save". In this case, if "automatic save" is not selected when the mobile phone A performs S302, after S302, the mobile phone A may perform S303 of displaying the second interface. If "automatic save" is selected when the mobile phone A performs S302, after S302, the mobile phone A may not perform S303 (in other words, may not display the second interface), but directly save identity information of the first application and the login information of the first account.

Generally, if "automatic save" is selected when the mobile phone A performs S302, the mobile phone A may alternatively save the login information of the first account. The login information of the first account that is saved by the mobile phone A is used to automatically log in to the first account in the first application when the mobile phone A starts the first application next time. In the case (3), the login information of the first account that is saved by the mobile phone A not only can be used to automatically log in to the first account in the first application when the mobile phone A starts the first application next time, but also can be used to share the login information of the first account with another device (for example, the mobile phone B), so that the mobile phone B can automatically log in to the first account based on the login information of the first account.

In the second application scenario, the login information of the first account includes the first account. In other words, the second interface is configured to request the user to confirm whether to save the first account. For example, the mobile phone A may log in to the first account in response to the tap operation performed by the user on the "Log in" button shown in FIG. 5. For example, the first account is 176**1860. After logging in to the first account, the mobile phone A may display a second interface 620 shown in (b) in FIG. 6A. The second interface 620 may include hint information 621, for example, "Please confirm whether to save the account 1761860!". The second interface 620 may further include a "YES" button 622 and a "NO" button 623. The "YES" button 622 is used to trigger the mobile phone A to save the first account. The "NO" button 623 is used to indicate the mobile phone A not to save the first account. Optionally, the second interface 620 may further include hint information 624**, for example, "The saved account can be shared with a device, and the account can be automatically logged in to on the another device!".

In some embodiments, the mobile phone A may further provide a function switch (also referred to as a menu switch) of a system. The mobile phone A may receive an enabling operation performed by the user on the function switch. If the user enters the account data on the account login interface of the first application, the mobile phone A may automatically save the identity information of the first application and the login information of the first account in response to the enabling operation. If the function switch is disabled, the mobile phone A does not automatically save the identity information of the first application and the login information of the first account.

For example, the mobile phone A may display the function switch on a setting interface of the mobile phone A, or the mobile phone A may display the function switch on a menu bar. A design of the function switch in the mobile phone A includes but is not limited to the foregoing manner. A specific location of the function switch is not limited in this embodiment of this application.

S304: The mobile phone A saves the identity information of the first application and the login information of the first account in response to an operation 1 performed by the user on the second interface.

The operation 1 is a second operation. The identity information of the first application may include a package name of the first application, or a package name of the first application and a signature public key of the first application.

For example, an Android (Android) system uses a package name (package name) to determine an identity of an application (that is, an application). However, a package name of an application may be freely set by a developer of the application. Therefore, to protect the application from being spoofed, when the application is released, a signature of the developer may be added to the application. The developer may generate a signature private key and a signature public key. The signature private key is used to is tampered with, a signature of the first application changes. In this embodiment of this application, when the mobile phone A starts the first application, the mobile phone A (for example, a PMS at a framework (framework) layer of the mobile phone A) may perform verification on the signature of the first application by using the signature public key of the first application, to determine whether the first application is tampered with. If the first application is tampered with, the mobile phone A cannot start the first application. If the first application is not tampered with, the mobile phone A can start the first application. The PMS is a package manager service (package manager service, PMS).

In this embodiment of this application, the mobile phone A (for example, the PMS at the framework of the mobile phone A) may determine whether a package name and a signature public key of the first application in the PMS match the identity information of the first application that is saved in the mobile phone A, to determine whether the package name of the first application is tampered with.

Specifically, the mobile phone A may obtain the package name and the signature public key of the first application from the PMS, and compare the obtained package name and signature public key of the first application with the identity information (including the package name and the signature public key) of the first application that is saved in the mobile phone A. If the package name of the first application that is obtained by the mobile phone A from the PMS service is the same as the package name of the first application in the identity information of the first application that is saved in the mobile phone A, and the signature public key of the first application that is obtained by the mobile phone A from the PMS service is the same as the signature public key of the first application in the identity information of the first application that is saved in the mobile phone A, it indicates that the package name of the first application is not tampered with.

Optionally, in some embodiments, an activity manager service (activity manager service. AMS) at the framework (framework) layer of the mobile phone A may alternatively determine whether the package name and the signature public key of the first application in the PMS match the identity information of the first application that is saved in the mobile phone A, to determine whether the package name of the first application is tampered with.

For example, the identity information of the first application includes the package name of the first application and the signature public key of the first application. The signature public key of the first application may be a character string including tens to hundreds of bytes. In the foregoing first application scenario, the mobile phone A may obtain and save the following identity information and login information:

---

```
<appid=com.android.shopping+deaf04e5jfhsgrck;        \\package name "shopping",
signature public key "deaf04e5jfhsgrck"\\
  id=180****7812; \\account "180****7812"\\
  pw=123xy256789> \\login account "123xy256789"\\
```

--- generate the foregoing signature. The signature public key is used to perform verification or authentication on the signature when the application is started.

It may be understood that, after the first application is installed in the mobile phone A, even if the first application is tampered with, the signature public key of the first application does not change. However, if the first application For example, the identity information of the first application includes the package name of the first application and the signature public key of the first application. In the foregoing second application scenario, the mobile phone A may obtain and save the following identity information and login information:

```
<appid=com.android.video+deaf04e64hfslfh;  \\package name "video", signature
public key signature "deaf04e64hfslfh"\\
   id=176****1860> \\account "176****1860"\\
```

In the following embodiment, an example in which the identity information of the first application includes the package name of the first application is used to describe the method in this embodiment of this application. It should be noted that, for a method in which the mobile phone A obtains the identity information of the first application, refer to a related method in the conventional technology. Details are not described herein in this embodiment of this application.

It can be understood that the mobile phone A may save related parameters of different applications in different storage areas, for example, data (such as audio data, image data, or video data) created when an application is used. In some embodiments, the mobile phone A may save the login information of the first application in a storage area corresponding to the first application. In some other embodiments, a storage area may be specially set for the mobile phone A. The storage area may be used to save login information of each application. For example, the mobile phone A may save login information of a plurality of applications shown in Table 1 in the storage area.

TABLE 1

| Login information table | | |
|---|---|---|
| Application package name | Account (that is, ID) | Login password |
| shopping | 180****7812 | 123xyz56789 |
| shopping | 157****7568 | 123abc56789 |
| video | 176****1860 | NULL |
| study | Xy123456 | Abc369x246 |

It is assumed that the package name of the shopping application is "shopping", the package name of the video application is "video", and the package name of the learning application is "study". As shown in Table 1, the mobile phone A saves login information of the account "180**7812" of the shopping application, for example, the account "1807812" and the login password "123xyz56789"; saves login information of the account "1761860" of the video application, for example, the account "176**1860"; and saves login information of the account "Xy123456" of the learning application, for example, the account "Xy123456" and the login password "Abc369x246".

Optionally, the mobile phone A may save login information of a plurality of accounts of one application. For example, as shown in Table 1, the mobile phone A saves the login information of the account "180**7812" of the shopping application, and further saves login information of the account "1577568" of the shopping application, for example, the account "157**7568" and the login password "123abc56789".

For example, the mobile phone A may save identity information of each application and the login information of the account in a database form, a file form, or another form. A specific manner in which the mobile phone A saves the identity information of each application and the login information of the account is not limited in this embodiment of this application.

S305: The mobile phone A does not save the identity information of the first application and the login information of the first account in response to an operation 2 performed by the user on the second interface.

For example, the operation 1 is the second operation, and the operation 2 is a sixth operation. The operation 1 may be a tap operation performed by the user on the "YES" button 612 on the second interface 610 shown in (a) in FIG. 6A; or the operation 1 may be a tap operation performed by the user on the "YES" button 622 on the second interface 620 shown in (b) in FIG. 6A. Alternatively, the operation 1 may be a first preset gesture entered by the user on the second interface, for example, an S-shaped gesture. Alternatively, the operation 1 may be a voice command entered by the user when the mobile phone A displays the second interface. For example, the voice command may include voice data such as "Save", "YES", "OK", or "Good".

Figure 6A:
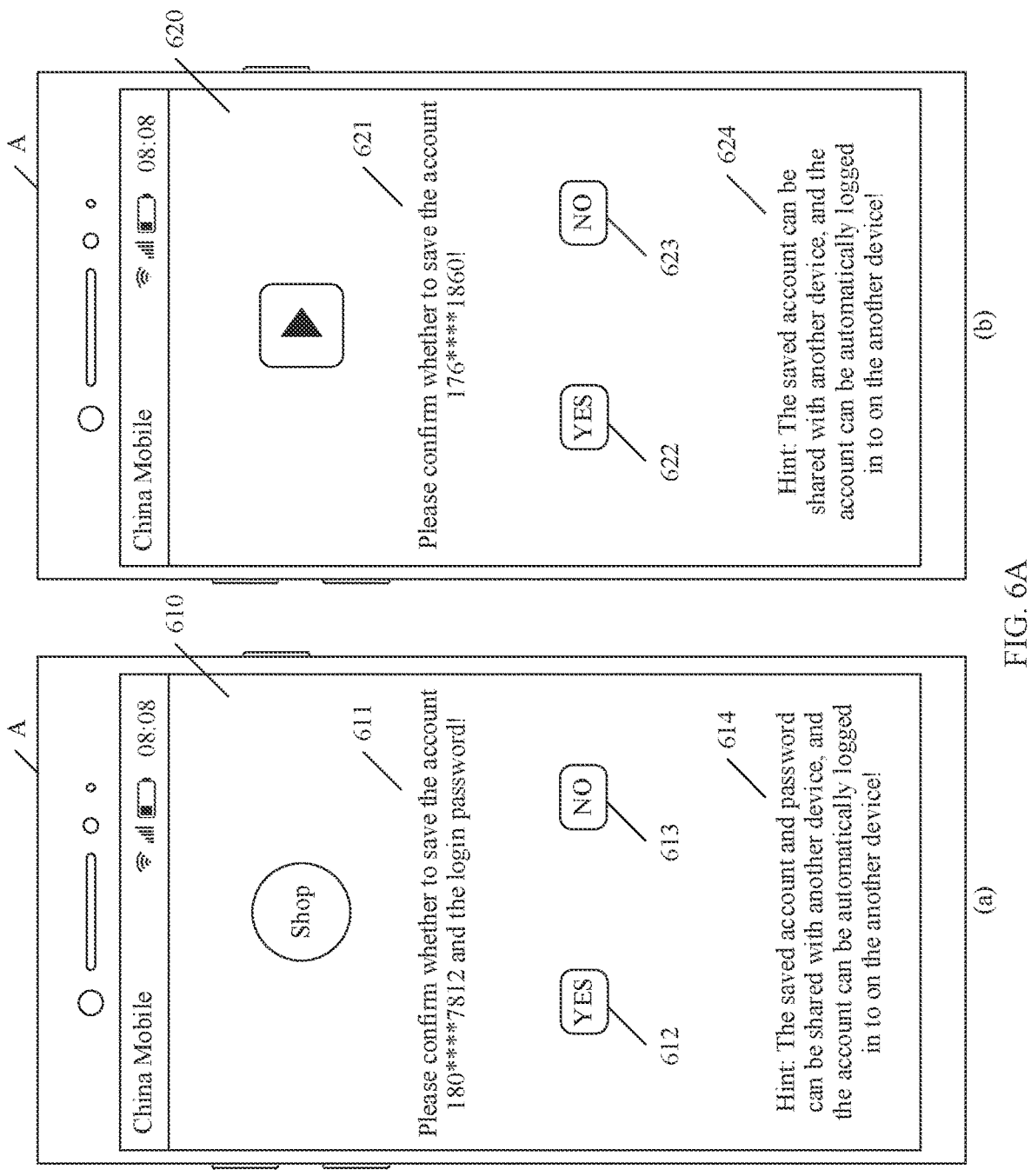
FIG. 6A is a schematic diagram of an instance of a second instance according to an embodiment of this application.

The operation 2 may be a tap operation performed by the user on the "NO" button 613 on the second interface 610 shown in (a) in FIG. 6A; or the operation 2 may be a tap operation performed by the user on the "NO" button 623 on the second interface 620 shown in (b) in FIG. 6A. Alternatively, the operation 2 may be a second preset gesture entered by the user on the second interface, for example, an L-shaped gesture. Alternatively, the operation 2 may be a voice command entered by the user when the mobile phone A displays the second interface. For example, the voice command may include voice data such as "Do not save" or "NO".

Figure 6B:
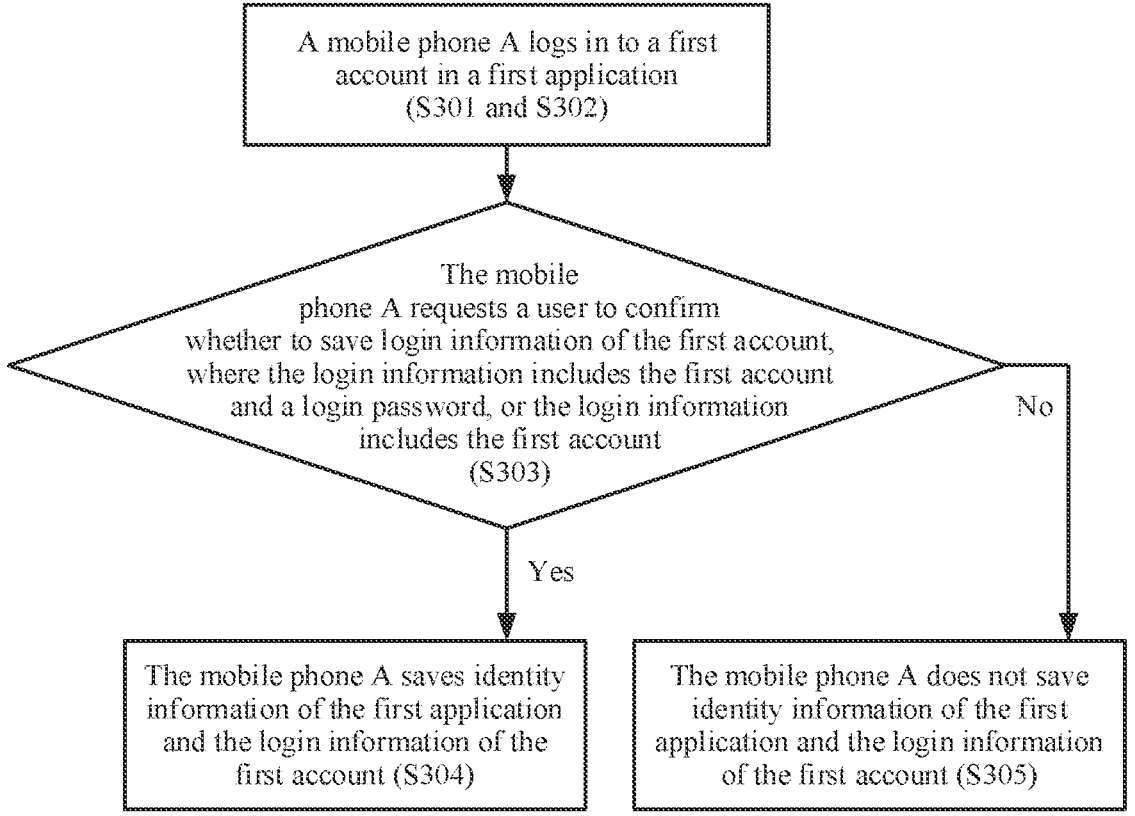
FIG. 6B is a flowchart of another account data sharing method according to an embodiment of this application.

FIG. 6B shows a flowchart block diagram of the procedure (1)(that is, the manual login procedure of the mobile phone A). As shown in FIG. 6B, the mobile phone A may perform S301 and S302 to log in to the first account in the first application. Then, the mobile phone A may perform S303 to request the user to confirm whether to save the login information of the first account. Finally, the mobile phone A may receive the operation 1 of the user. The operation 1 is used to indicate the mobile phone A to save the login information of the first account. The mobile phone A may perform S304 of saving the identity information of the first application and the login information of the first account in response to the operation 1. Alternatively, after S303, the mobile phone A may receive the operation 2 of the user. The operation 2 is used to indicate the mobile phone A not to save the login information of the first account. The mobile phone A may perform S305 of skipping saving the identity information of the first application and the login information of the first account in response to the operation 2.

In this embodiment of this application, after logging in to the first account, the mobile phone A may save the login information of the first account in response to the operation 1 of the user. In this way, when receiving an operation used to share the first account, the mobile phone A may share the saved login information with the another device.

It may be understood that, after the foregoing procedure (1), the mobile phone A has logged in to the first account in the first application, and the mobile phone A saves the login information of the first account. It can be learned from Table 1 that the mobile phone A may log in to a plurality of accounts in the first application, and the mobile phone A may save login information of the plurality of accounts for the first application. However, the mobile phone A cannot simultaneously log in to a plurality of accounts in the first application, and can selectively log in to only one account at a same time. The first account in this embodiment of this application is an account currently logged in to by the mobile phone A in the first application.

Figures 1, 7A:
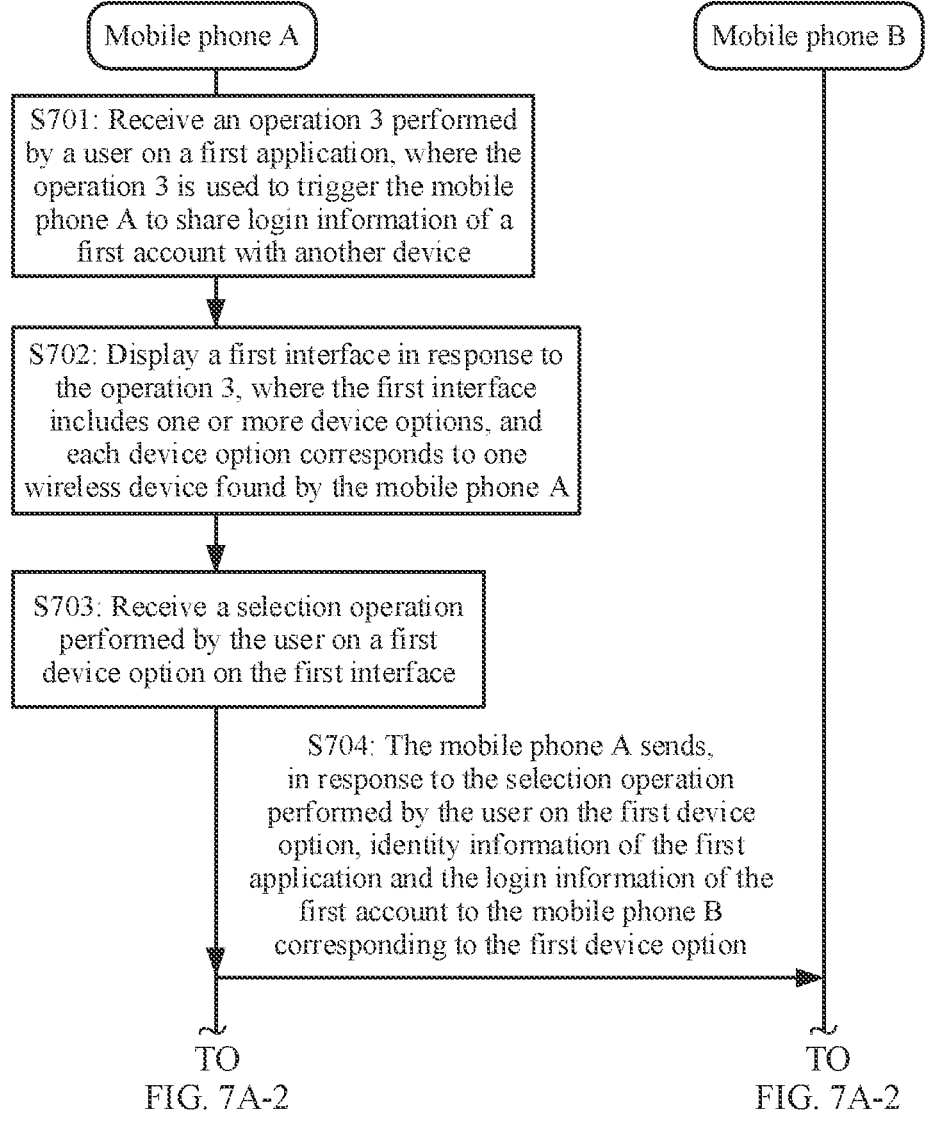

An embodiment of this application provides an account data sharing method. As shown in FIG. 3A and FIG. 3C, the foregoing procedure (2), that is, the "procedure in which the mobile phone A shares account data with the mobile phone B", may include S701 to S704. Alternatively, as shown in FIG. 7A-1 and FIG. 7A-2, the account data sharing method may include S701 to S704.

S701: The mobile phone A receives an operation 3 performed by the user on the first application, where the operation 3 is used to trigger the mobile phone A to share the login information of the first account with the another device.

The operation 3 is a first operation. For example, the operation 3 may be a user operation described in the following implementation (1) or implementation (2).

Implementation (1)

The mobile phone A may receive a preset operation performed by the user on an icon of the first application displayed on a home screen (namely, a home screen). For example, the preset operation is any operation such as a touch and hold operation, a double-tap operation, or a slide operation (for example, a slide-up operation or a slide-down operation) performed on the icon of the first application. The mobile phone A may display a preset option (also referred to as a "Share login" option or a "Share login status" option) of the first application in response to the preset operation. The mobile phone A may perform S702 in response to a tap operation (for example, a single-tap operation) performed by the user on the preset option, to display a device search interface of the mobile phone A.

For example, the first application is a shopping application, and the preset operation is a touch and hold operation. The mobile phone A may display a "Share login" option 701 shown in (a) in FIG. 7B in response to a touch and hold operation performed by the user on an icon 403 of the shopping application. The mobile phone A may display a device search interface 703 shown in (b) in FIG. 7B in response to a tap operation performed by the user on the "Share login" option 701.

It can be learned from the foregoing descriptions that, in the implementation (1), the operation 3 (that is, the first operation) may include the preset operation performed by the user on the icon of the first application and the tap operation performed by the user on the "Share login" option.

Implementation (2)

The mobile phone A may display a preset page of the first application. The preset page may be any page of the first application, for example, a home page of the first application or another page of the first application. The preset page may include a preset control, for example, a "Share login" control. The preset control is used to trigger the mobile phone A to share the login information of the first account with the another device. The operation 3 (that is, the first operation) may be a tap operation performed by the user on the preset control, for example, any operation such as a single-tap operation or a double-tap operation. Alternatively, the operation 3 (for example, the first operation) may be a voice instruction that is received when the mobile phone A displays the preset page including the preset control and that is used to indicate the mobile phone A to trigger the preset control.

Figure 7B:
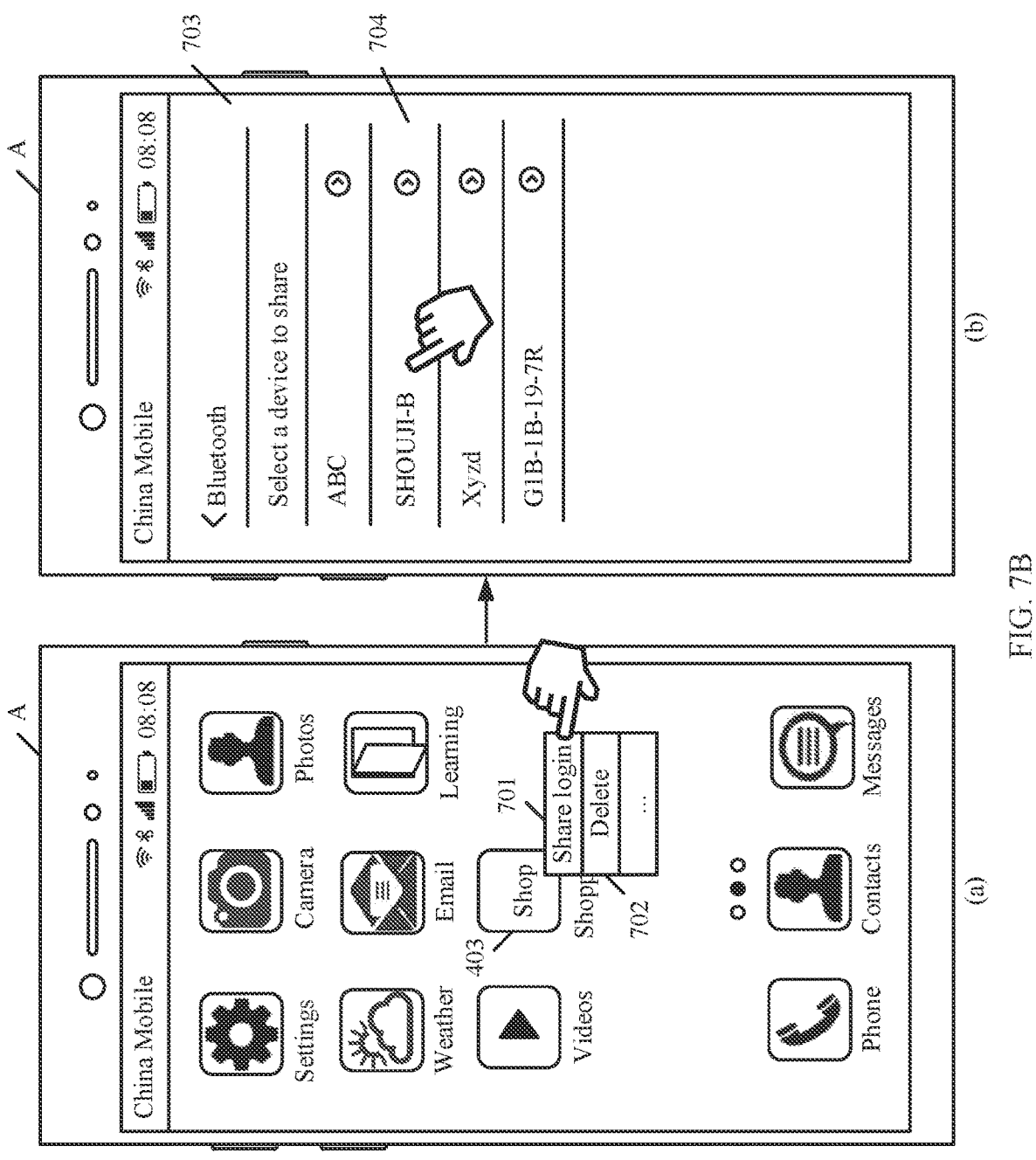
FIG. 7B is a schematic diagram of an instance of another display interface of a mobile phone according to an embodiment of this application.
Figure 7C:
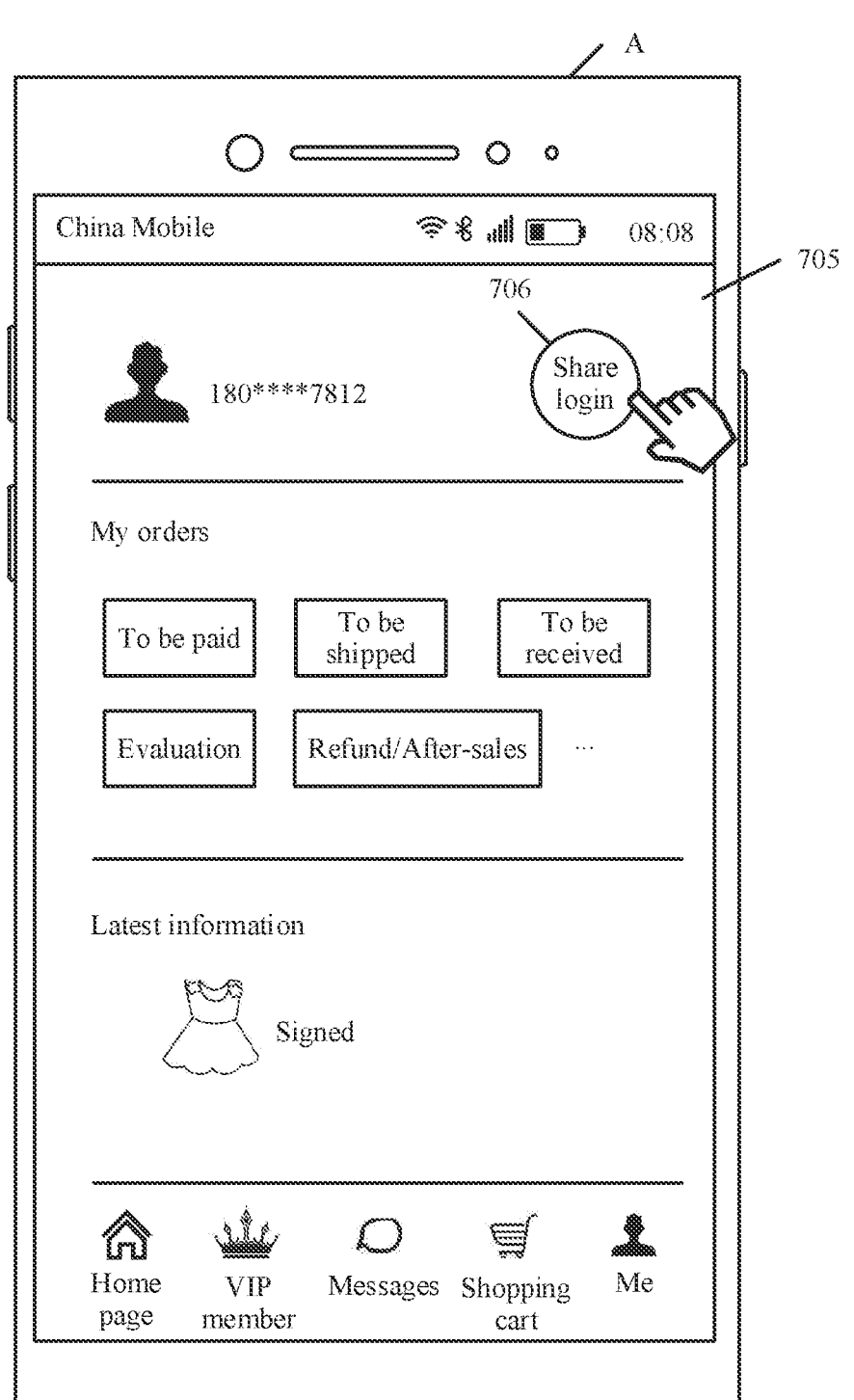
FIG. 7C is a schematic diagram of an instance of another display interface of a mobile phone according to an embodiment of this application.

For example, the preset page is an account management interface 705 of the shopping application shown in FIG. 7C.

The account management interface 705 includes a "Share login" control 706 (that is, the preset control). The mobile phone A may display a device search interface 703 shown in (b) in FIG. 7B in response to a tap operation performed by the user on the "Share login" control 706 shown in FIG. 7C.

S702: The mobile phone A displays a first interface in response to the operation 3, where the first interface includes one or more device options, and each device option corresponds to one wireless device found by the mobile phone A.

For example, the wireless devices corresponding to the one or more device options are wireless devices of wireless signals that can be found by the mobile phone A. The wireless signal may be any signal such as a Bluetooth signal, a Wi-Fi signal, or an NFC signal. For example, the wireless signal is a Bluetooth signal. The first interface may be the device search interface 703 shown in (b) in FIG. 7B. The device search interface 703 includes the following device options: an "ABC" option, a "SHOUJI-B" option 704, an "Xyzd" option, and a "G1B-1B-19-7R" option. Each device option corresponds to one Bluetooth device. It is assumed that the "SHOUJI-B" option 704 is a Bluetooth name of the mobile phone B, and a Bluetooth device corresponding to the "SHOUJI-B" option 704 is the mobile phone B.

It can be understood that a state in which the mobile phone A displays the first interface in response to the operation 3 may be referred to as a to-be-shared state. In other words, the mobile phone A may enter the to-be-shared state in response to the operation 3. In the to-be-shared state, the mobile phone A may share, in response to a selection operation performed by the user on a device option, the login information of the first account with a wireless device corresponding to the device option selected by the user.

S703: The mobile phone A receives a selection operation performed by the user on a first device option on the first interface.

S704: The mobile phone A sends, in response to the selection operation performed by the user on the first device option, the identity information of the first application and the login information of the first account to the mobile phone B corresponding to the first device option.

The first device option may be any device option selected by the user on the first interface. It is assumed that the first device option is the "SHOUJI-B" option 704 on the device search interface 703 (that is, the first interface) shown in (b) in FIG. 7B. The mobile phone A may send, in response to a selection operation (for example, a tap operation) performed by the user on the "SHOUJI-B" option 704 shown in (b) in FIG. 7B, the identity information of the first application and the login information of the first account to the mobile phone B through a Bluetooth connection between the mobile phone A and the mobile phone B.

In a case, the mobile phone B corresponding to the first device option has established a wireless connection to the mobile phone A In this case, the mobile phone A may directly send the identity information of the first application and the login information of the first account to the mobile phone B through the Bluetooth connection between the mobile phone A and the mobile phone B.

In another case, the mobile phone B corresponding to the first device option does not establish a wireless connection to the mobile phone A. In this case, the mobile phone A may request to establish a wireless connection to the mobile phone B in response to the selection operation performed by the user on the first device option. After establishing the wireless connection to the mobile phone B, the mobile phone A may automatically send the identity information of the first application and the login information of the first account to the mobile phone B.

It should be noted that, for a method for establishing a wireless connection between the mobile phone A and the mobile phone B, refer to a method for establishing a wireless connection between two devices in the conventional technology. Details are not described herein in this embodiment of this application.

Figure 7D:
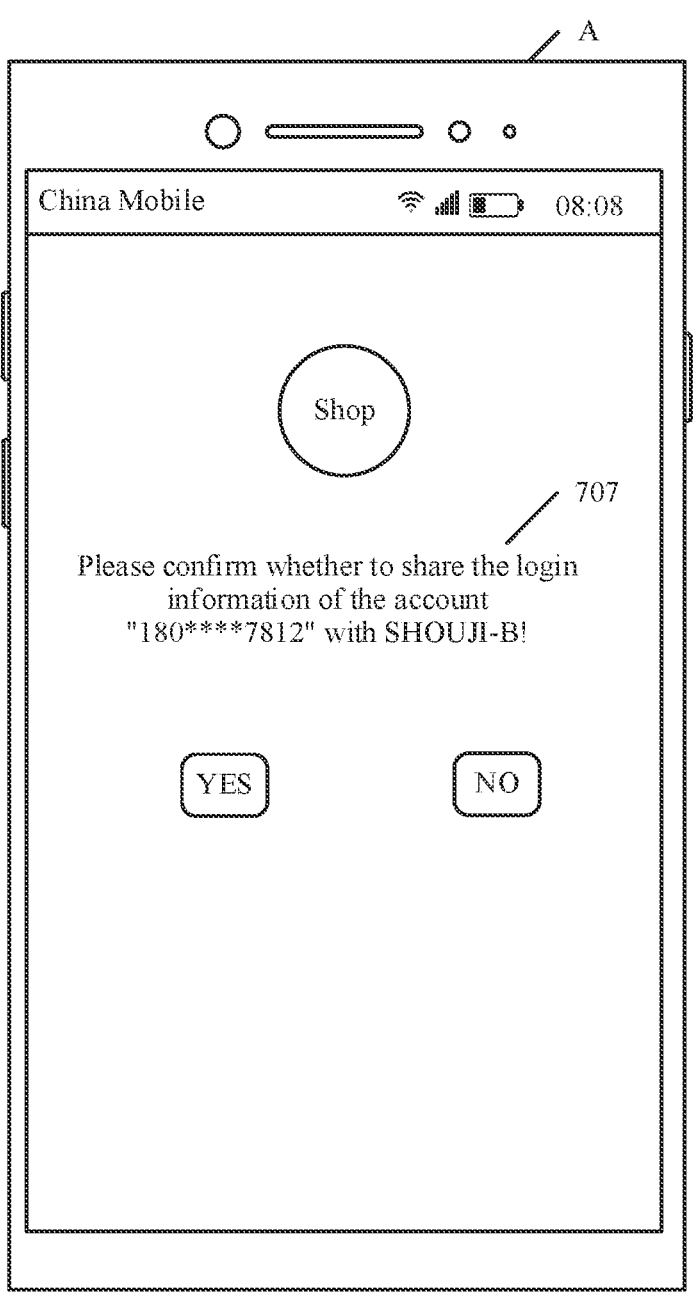
FIG. 7D is a schematic diagram of an instance of another display interface of a mobile phone according to an embodiment of this application.

In some embodiments, the mobile phone A may display first hint information in response to the selection operation performed by the user on the first device option. The first hint information is used to request the user to confirm whether to share the login information of the first account with the wireless device corresponding to the first device option. For example, the mobile phone A may display first hint information 707 shown in FIG. 7D in response to the selection operation performed by the user on the "SHOUJI-B" option 704 shown in (b) in FIG. 7B, for example, "Please confirm whether to share the login information of the account '180**7812' with SHOUJI-B!" The first hint information may further include a "YES" button and a "NO" button. The mobile phone A may receive an operation 4 performed by the user on the first hint information. The operation 4 is a third operation. The mobile phone A may send the identity information of the first application and the login information of the first account to the mobile phone B in response to the operation 4 performed on the first hint information (for example, a tap operation performed on the "YES" button). The mobile phone A does not send the identity information of the first application and the login information of the first account to the mobile phone B in response to an operation 5 performed on the first hint information (for example, a tap operation performed on the "NO" button), and the mobile phone A may display the first interface 703 shown in (b) in FIG. 7B or the home screen 400 shown in FIG. 4**(*a*).

In some embodiments, to protect user information security, the mobile phone A may perform user identity authentication in response to the selection operation performed by the user on the first device option. If the user identity authentication succeeds, the mobile phone A may send the identity information of the first application and the login information of the first account to the mobile phone B. Alternatively, if the user identity authentication succeeds, the mobile phone A may display the first hint information, and the mobile phone A may send the identity information of the first application and the login information of the first account to the mobile phone B in response to the first operation performed by the user on the first hint information.

In some other embodiments, to protect user information security, the mobile phone A may perform user identity authentication in response to the third operation (for example, the operation 4) performed on the first hint information. If the user identity authentication succeeds, the mobile phone A may send the identity information of the first application and the login information of the first account to the mobile phone B.

In the foregoing embodiment, if the identity authentication fails, the mobile phone A does not send the identity information of the first application and the login information of the first account to the mobile phone B, and the mobile phone A may return to the first interface 703 shown in (b) in FIG. 7B or the home screen 400 shown in FIG. 4(*a*).

For example, the user identity authentication may be password authentication or fingerprint authentication. The mobile phone A may display a password and/or fingerprint enroll interface, and receive a password or a fingerprint entered by the user, to perform user identity authentication. Alternatively, the user identity authentication may be face recognition or iris recognition. The mobile phone A may display a face recognition interface or an iris recognition interface, and collect a face image or iris information entered by the user, to perform user identity authentication. Alternatively, the mobile phone A may collect a face image or iris information of the user in a user-unaware manner, to perform user identity authentication.

Figure 7E:
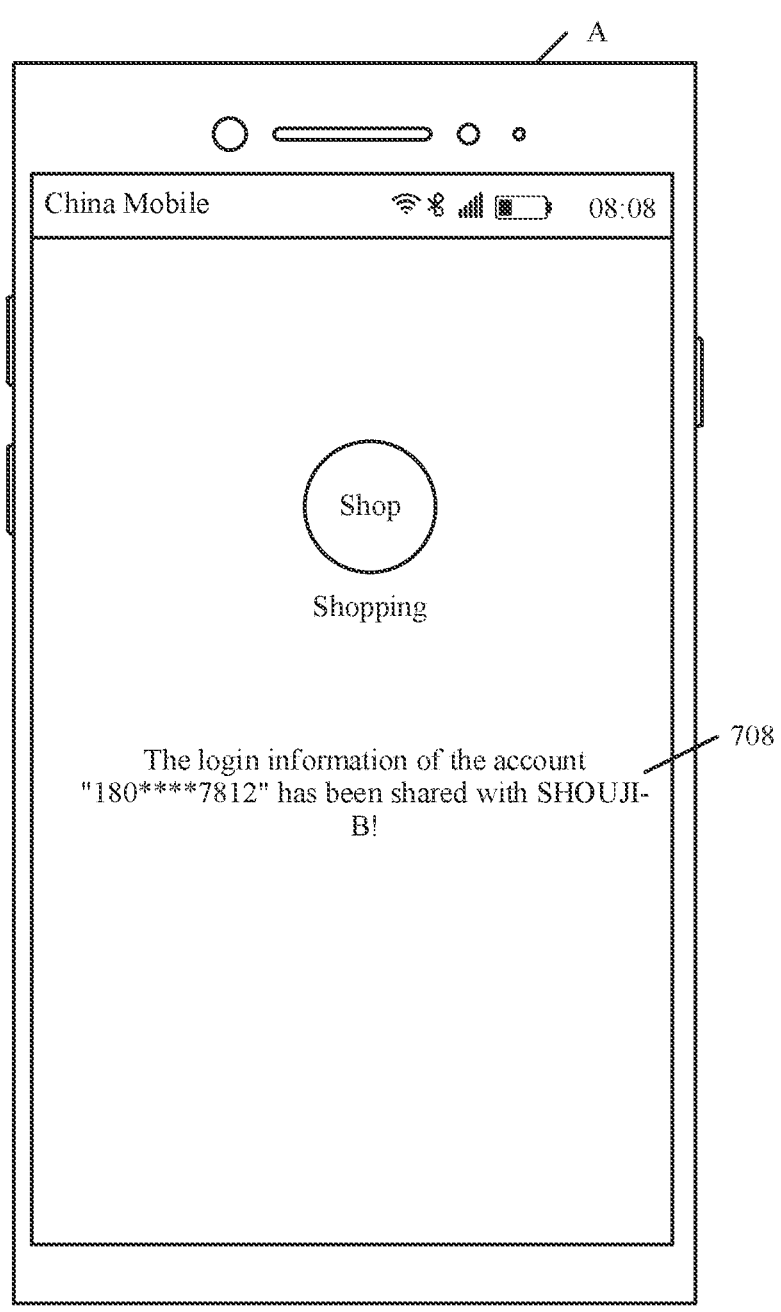
FIG. 7E is a schematic diagram of an instance of another display interface of a mobile phone according to an embodiment of this application.

In some embodiments, after S704, the mobile phone A may display second hint information. The second hint information is used to indicate that the mobile phone A has shared the login information of the first account with the mobile phone B. For example, the mobile phone A may display second hint information 708 shown in FIG. 7E, for example, "The login information of the account '180****7812' has been shared with SHOUJI-B!".

In the account data sharing method provided in this embodiment of this application, a client and a server of any application do not need to be further developed, and the mobile phone A may share login information of the application with the another device in response to the operation 3 (that is, the first operation) performed by the user on the application. In other words, according to the method in this embodiment of this application, the electronic device may pertinently share login information of an application selected by the user with the another device (for example, the mobile phone B). In conclusion, the method in this embodiment of this application can protect user information security and intelligently implement one-time authorized login between devices at low costs.

It may be understood that, after the foregoing procedure (2), the mobile phone B may receive the login information of the first account sent by the mobile phone A. The mobile phone B may log in to the first account in the first application based on the login information of the first account. Specifically, as shown in FIG. 3A and FIG. 3C, the foregoing procedure (3), that is, the "automatic login procedure of the mobile phone B", may include S801 to S805. Alternatively, as shown in FIG. 7A-1 and FIG. 7A-2, the account data sharing method may include S801 to S805.

S801: The mobile phone B receives the identity information of the first application and the login information of the first account from the mobile phone A.

The mobile phone B may receive the identity information of the first application and the login information of the first account from the mobile phone A through a wireless connection between the mobile phone B and the mobile phone A.

S802: The mobile phone B determines, based on the identity information of the first application, whether the mobile phone B runs the first application.

In this embodiment of this application, that the mobile phone B runs the first application may specifically include any one of the following three cases. Case (1): The mobile phone B runs the first application in the foreground. Case (2): The mobile phone B runs the first application in the background. Case (3): The mobile phone B displays a web page of the first application in a browser.

For example, in some embodiments, the mobile phone B may determine, by performing step 1 to step 7, whether the mobile phone B runs the first application.

Step 1: The mobile phone A compares the identity information of the first application (for example, the package name of the first application) with a package name of an application running in the foreground of the mobile phone B.

Step 2: If the package name of the first application is the same as the package name of the application running in the foreground, it indicates that the mobile phone B is running the first application, in other words, the mobile phone B runs the first application in the foregoing case (1).

Step 3: If the package name of the first application is different from the package name of the application running in the foreground, the mobile phone B may compare the package name of the first application with a package name of an application running in the background of the mobile phone B. Step 4: If the package name of the first application is the same as a package name of any application running in the background of the mobile phone B, it indicates that the mobile phone B is running the first application, in other words, the mobile phone B runs the first application in the foregoing case (2).

Step 5: If the package name of the first application is different from a package name of each application running in the background of the mobile phone B, the mobile phone B may determine whether the mobile phone B opens the web page of the first application in the browser. Step 6: If the mobile phone B opens the web page of the first application in the browser, it indicates that the mobile phone B is running the first application, in other words, the mobile phone B runs the first application in the foregoing case (3). Step 7: If the mobile phone B does not open the web page of the first application in the browser, it indicates that the mobile phone B does not run the first application.

The mobile phone B may run the browser in the foreground or run the browser in the background. The mobile phone B may pre-store a correspondence between the package name of the first application and the web page of the first application. Alternatively, the mobile phone B may obtain the correspondence between the package name of the first application and the web page of the first application from the server of the first application.

In some other embodiments, after step 3, if the package name of the first application is different from the package name of each application running in the background of the mobile phone B, the mobile phone B may not perform step 5 (in other words, may not determine whether the mobile phone B opens the web page of the first application in the browser), but directly determine that the mobile phone B does not run the first application.

Specifically, if the mobile phone B is running the first application, the mobile phone B may perform S803. If the mobile phone B does not run the first application, the mobile phone B may perform S805.

Figure 8:
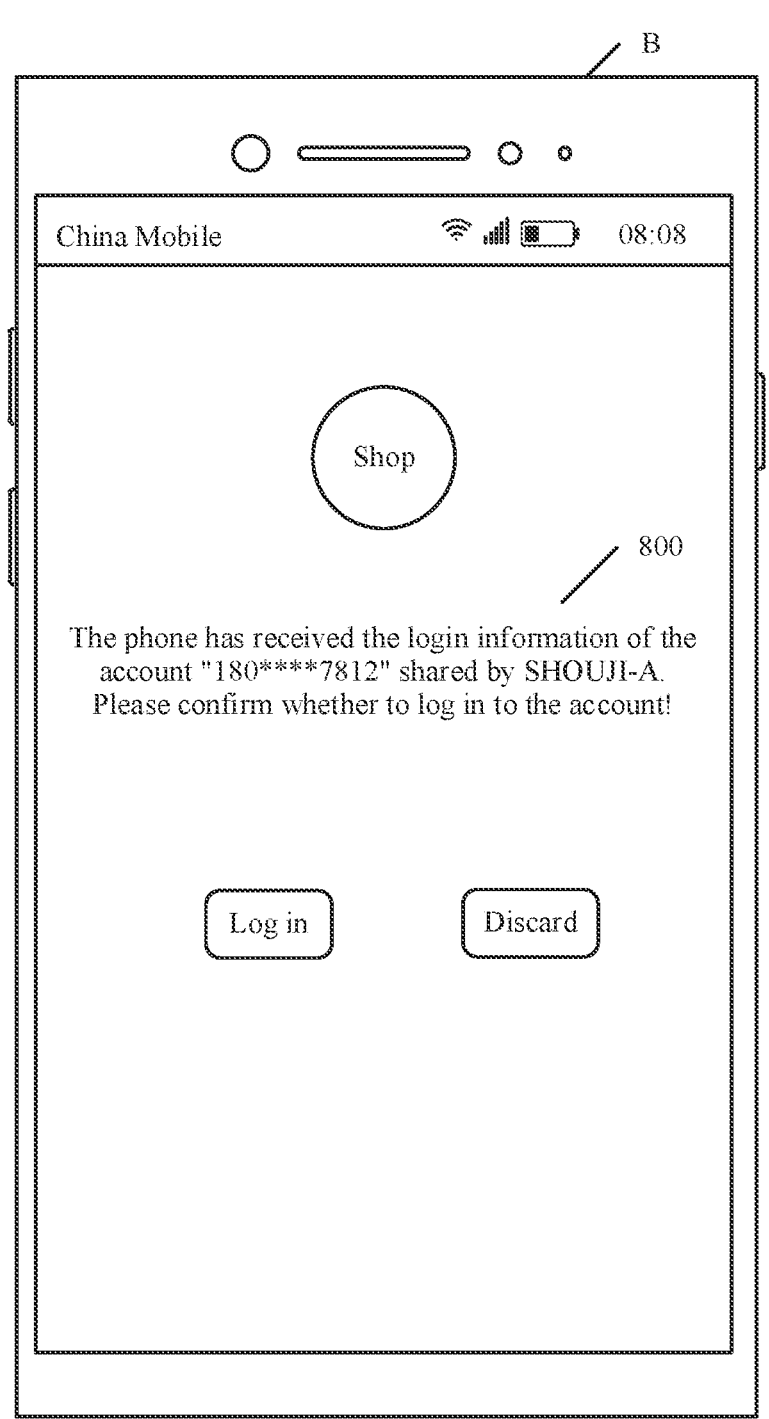
FIG. 8 is a schematic diagram of an instance of another display interface of a mobile phone according to an embodiment of this application.

In some embodiments, after S801, the mobile phone B may display a third interface. The third interface is configured to request a user to confirm whether to log in to the first account by using the login information of the first account that is shared by the mobile phone A. For example, the mobile phone B may display a third interface 800 shown in FIG. 8. The third interface 800 includes hint information "The phone has received the login information of the account '180****7812' shared by SHOUJI-A. Please confirm whether to log in to the account!" The third interface 800 further includes a "Log in" button and a "Discard" button. The mobile phone B may receive an operation 6 performed by the user on the third interface 800. The operation 6 is a fifth operation. The mobile phone A may perform S802 in response to the operation 6 performed by the user on the third interface 800. The mobile phone A may perform S805 in response to an operation 7 performed by the user on the third interface 800. The operation 6 is used to trigger the mobile phone B to log in to the first account. For example, the operation 6 may be a tap operation performed by the user on the "Log in" button on the third interface 800. The operation 7 is used to indicate the mobile phone B not to log in to the first account. For example, the operation 7 may be a tap operation performed by the user on the "Discard" button on the third interface 800.

In some other embodiments, after S802, if the mobile phone B is running the first application, the mobile phone B may display a third interface. For example, the mobile phone B may display a third interface 800 shown in FIG. 8. The mobile phone B may perform S803 in response to a first operation performed by a user on the third interface 800. The mobile phone B may perform S805 in response to a second operation performed by the user on the third interface 800.

S803: The mobile phone B displays an account login interface of the first application, and fills the login information of the first account on the account login interface.

In a case, when the mobile phone B performs S801, the mobile phone B runs the first application in the foreground. In addition, the mobile phone B is displaying the account login interface of the first application. For example, to enable the mobile phone B to log in to the first account based on the login information of the first account from the mobile phone A, the user of the mobile phone B may operate the mobile phone B in advance to display the account login interface of the first application. In other words, before performing S801 (that is, receiving the identity information of the first application and the login information of the first account from the mobile phone A), the mobile phone B has run the first application in the foreground in response to a user operation, and is displaying the account login interface of the first application. In this case, the mobile phone B may directly enter the login information of the first account on the account login interface.

In another case, when the mobile phone B performs S801, the mobile phone B runs the first application in the foreground. However, the mobile phone B does not display the account login interface of the first application. For example, the mobile phone B displays a home page of the first application. In this case, the mobile phone B may automatically jump to the account login interface of the first application, in other words, automatically display the account login interface of the first application, and enter the login information of the first account on the account login interface.

In another case, when the mobile phone B performs S801, the mobile phone B runs the first application in the background. In addition, an interface to be displayed when the mobile phone B runs the first application in the background is the account login interface. In this case, the mobile phone B may run the first application in the foreground, display the account login interface of the first application, and enter the login information of the first account on the account login interface.

In another case, when the mobile phone B performs S801, the mobile phone B runs the first application in the background. In addition, an interface to be displayed when the mobile phone B runs the first application in the background is not the account login interface. In this case, the mobile phone B may run the first application in the foreground, automatically jump to the account login interface of the first application, in other words, automatically display the account login interface of the first application, and enter the login information of the first account on the account login interface.

In another case, when the mobile phone B performs S801, the mobile phone B displays the web page of the first application in the browser. The mobile phone B may run the browser in the foreground or run the browser in the background. In addition, the web page is the account login interface of the first application. In this case, the mobile phone B may run the browser in the foreground, and display the web page of the first application in the browser, that is, the account login interface. Then, the mobile phone B may enter the login information of the first account on the account login interface.

Figure 9:
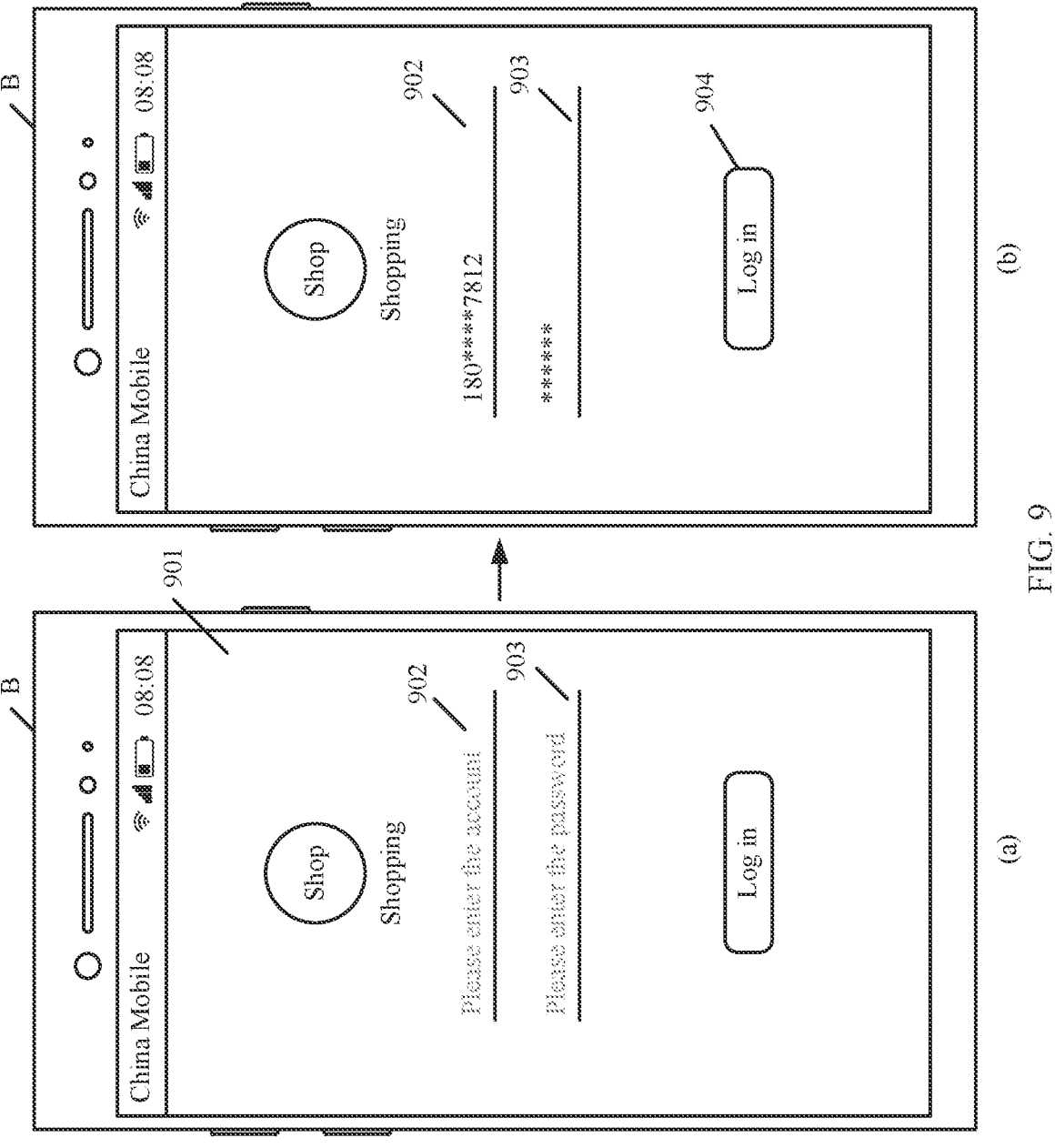
FIG. 9 is a schematic diagram of an instance of another display interface of a mobile phone according to an embodiment of this application.

In the first application scenario, the login information of the first account includes the first account and the login password of the first account. In this application scenario, the account login interface of the first application in S803 may be an account login interface 901 of the first application shown in (a) in FIG. 9. The account login interface 901 includes an "account input box" 902 and a "login password input box" 903.

In this application scenario, the mobile phone B may detect the "account input box" on the account login interface, fill the first account into the detected "account input box" 902, detect the "login password input box" on the account login interface, and fill the login password of the first account into the detected "login password input box" 903. The mobile phone B may display an account login interface shown in (b) in FIG. 9. On the account login interface shown in (b) in FIG. 9, the "account input box" 902 is filled with the first account "180**7812", and the "login password input box" 903** is filled with the login password.

The mobile phone B may determine, by detecting an attribute and hint information of an input box control (for example, the "account input box" 902 or the "login password input box" 903) on a current page displayed by the mobile phone B, whether the input box control is used for entering an account or a password. The hint information is default hint information in a text box (for example, the foregoing input box control). For example, the hint information may be hint information "Please enter the account" in the "account input box" 902 and hint information "Please enter the password" in the "login password input box" 903 shown in (a) in FIG. 9. The hint information in the input box control may disappear in response to a tap operation performed by the user on the input box control.

For example, the account login interface of the first application is a web page login interface of the first application. By using a gethtmlinfo method, the mobile phone B may obtain related information (such as the attribute and the hint information) of the input box control to determine whether the input box control is used for entering an account or a password. By using the gethtmlinfo method, the mobile phone B may obtain hypertext markup language (Hypertext Markup Language, HTML) information on the account login interface of the first application, that is, the related information of the input box control, to identify the input box control used for entering an account or a password.

Figure 10A:
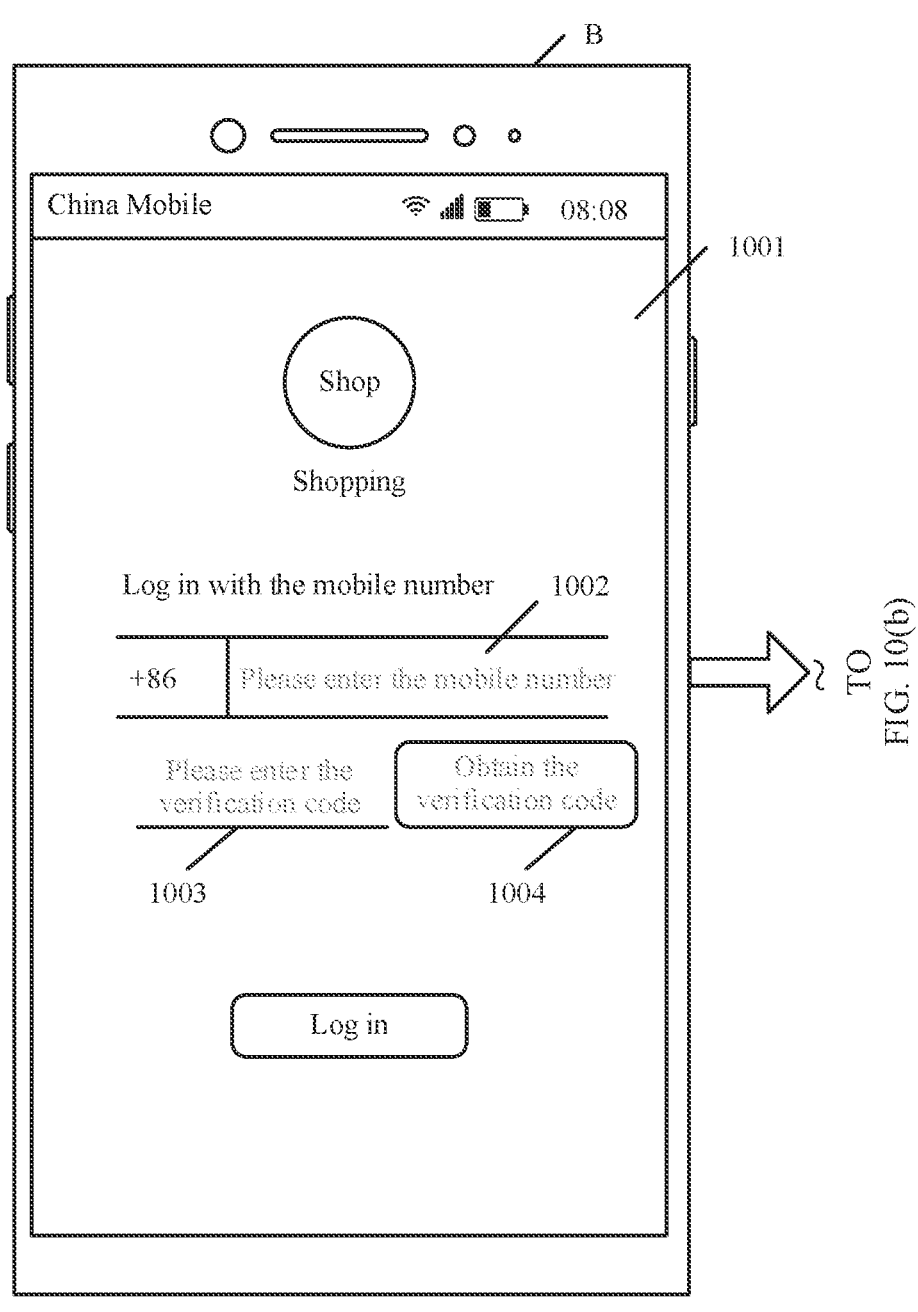
FIG. 10(*a*) to FIG. 10(*c*) are a schematic diagram of an instance of another display interface of a mobile phone according to an embodiment of this application.

In the second application scenario, the login information of the first account includes the first account, but does not include the login password of the first account. In this application scenario, the account login interface of the first application in S803 may be an account login interface 1001 of the first application shown in FIG. 10(a). The account login interface 1001 includes an "account input box" 1002, a "verification code input box" 1003, and an "Obtain the verification code" button 1004.

In this application scenario, the mobile phone B may detect an "account input box" on the account login interface, and fill the first account into the detected "account input box" 1002. The mobile phone B may display an account login interface shown in FIG. 10(b). On the account login interface shown in FIG. 10(b), the "account input box" 1002 is filled with the first account "180****7812".

In some embodiments, the identity information of the first application includes the package name of the first application and the signature public key of the first application. Before performing S803, the mobile phone B may further determine whether the package name of the first application is tampered with. A method in which the mobile phone B determines whether the package name of the first application is tampered with is similar to the method in which the mobile phone A determines whether the package name of the first application is tampered with. Details are not described herein again in this embodiment of this application. If the package name of the first application is not tampered with, the mobile phone B may perform S803; or if the package name of the first application is tampered with, the mobile phone B may perform S805.

S804: The mobile phone B logs in, in response to an operation 8 performed on the account login interface, to the first account in the first application by using the login information of the first account.

The operation 8 is a fourth operation. In the first application scenario, the operation 8 may be a tap operation performed by the user on a "Log in" button 904 shown in (b) in FIG. 9. Alternatively, the operation 8 may be an automatic tap operation performed on the "Log in" button 904 after the mobile phone B fills the first account and the login password of the first account on the account login interface shown in (b) in FIG. 9. For example, the mobile phone B may perform S803 of displaying the account login interface shown in (a) in FIG. 9. Then, the mobile phone B may display an animation in which the first account and the login password of the first account are automatically filled on the account login interface and the "Log in" button 904 is automatically tapped. Finally, the mobile phone B may log in to the first account, and display an interface after logging in to the first application.

Figure 11A:
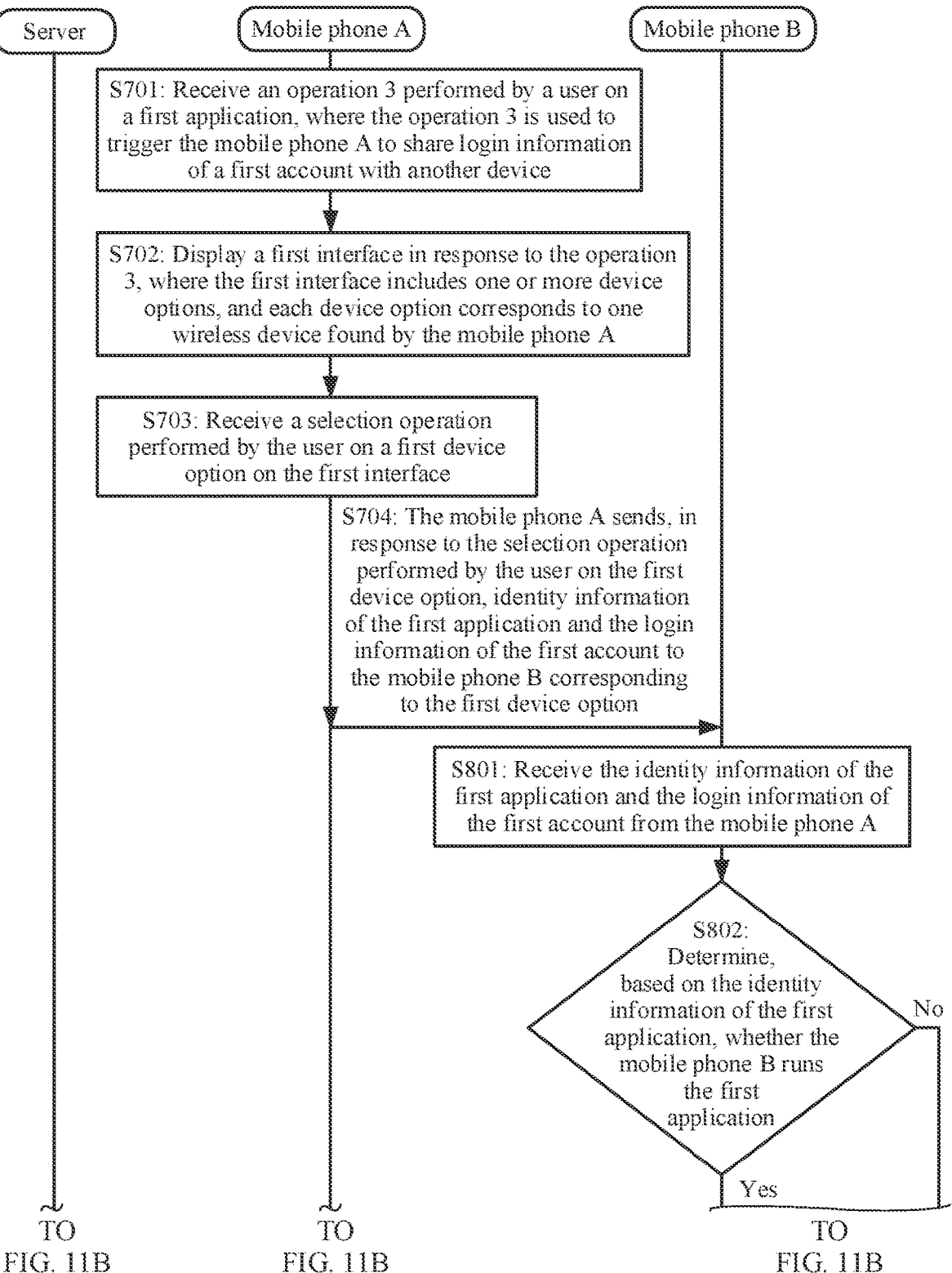
FIG. 11A and FIG. 11B are a flowchart of another account data sharing method according to an embodiment of this application.
Figure 11B:
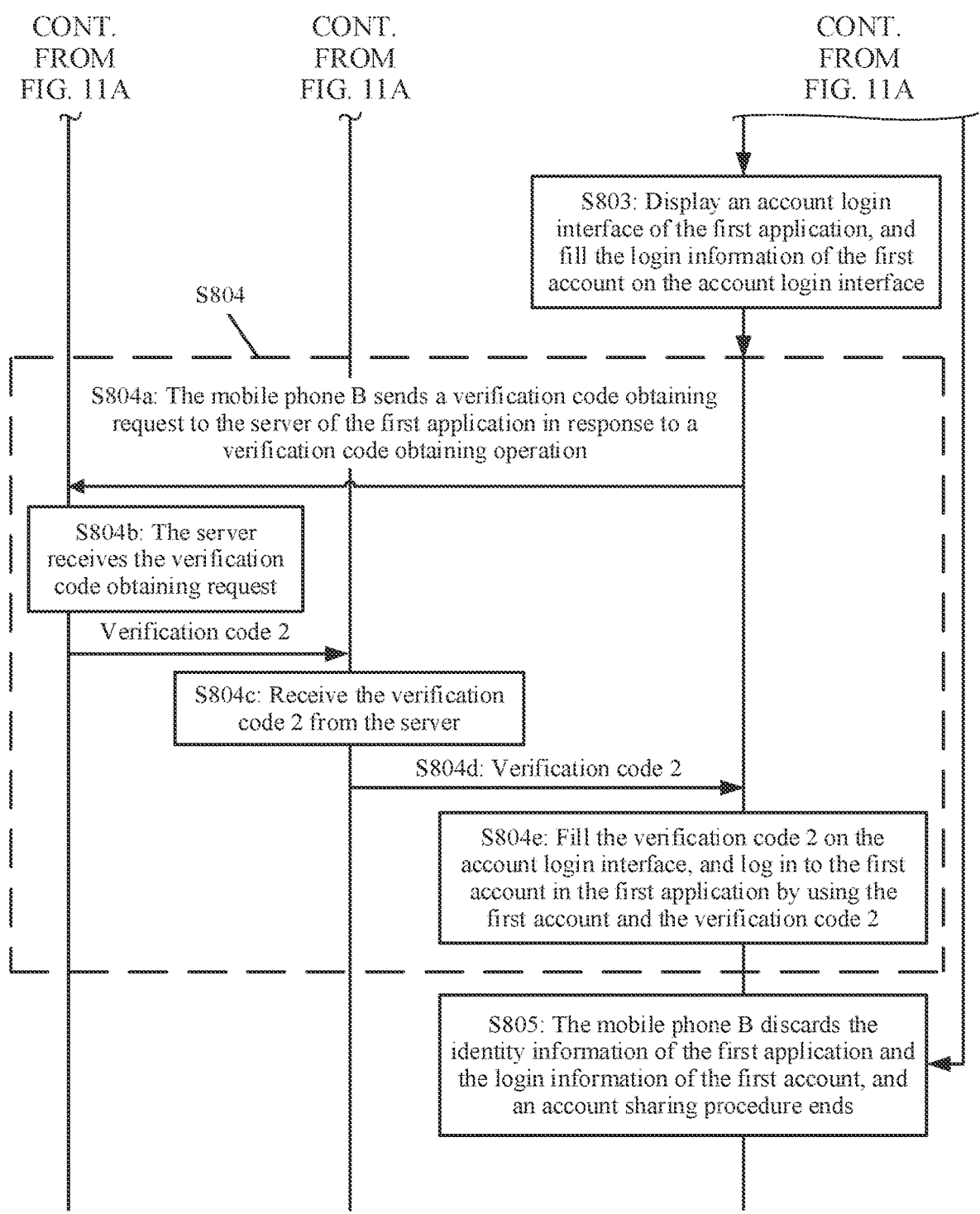

In the second application scenario, S804 may include S804a to S804e. For example, as shown in FIG. 11A and FIG. 11B. S804 shown in FIG. 7A-1 and FIG. 7A-2 may include S804a to S804e.

S804a: The mobile phone B sends a verification code obtaining request to the server of the first application in response to a verification code obtaining operation.

The verification code obtaining request includes the first account "176**1860", and the verification code obtaining request is used to request the server to send a verification code to 176**1860.

Figure 10B:
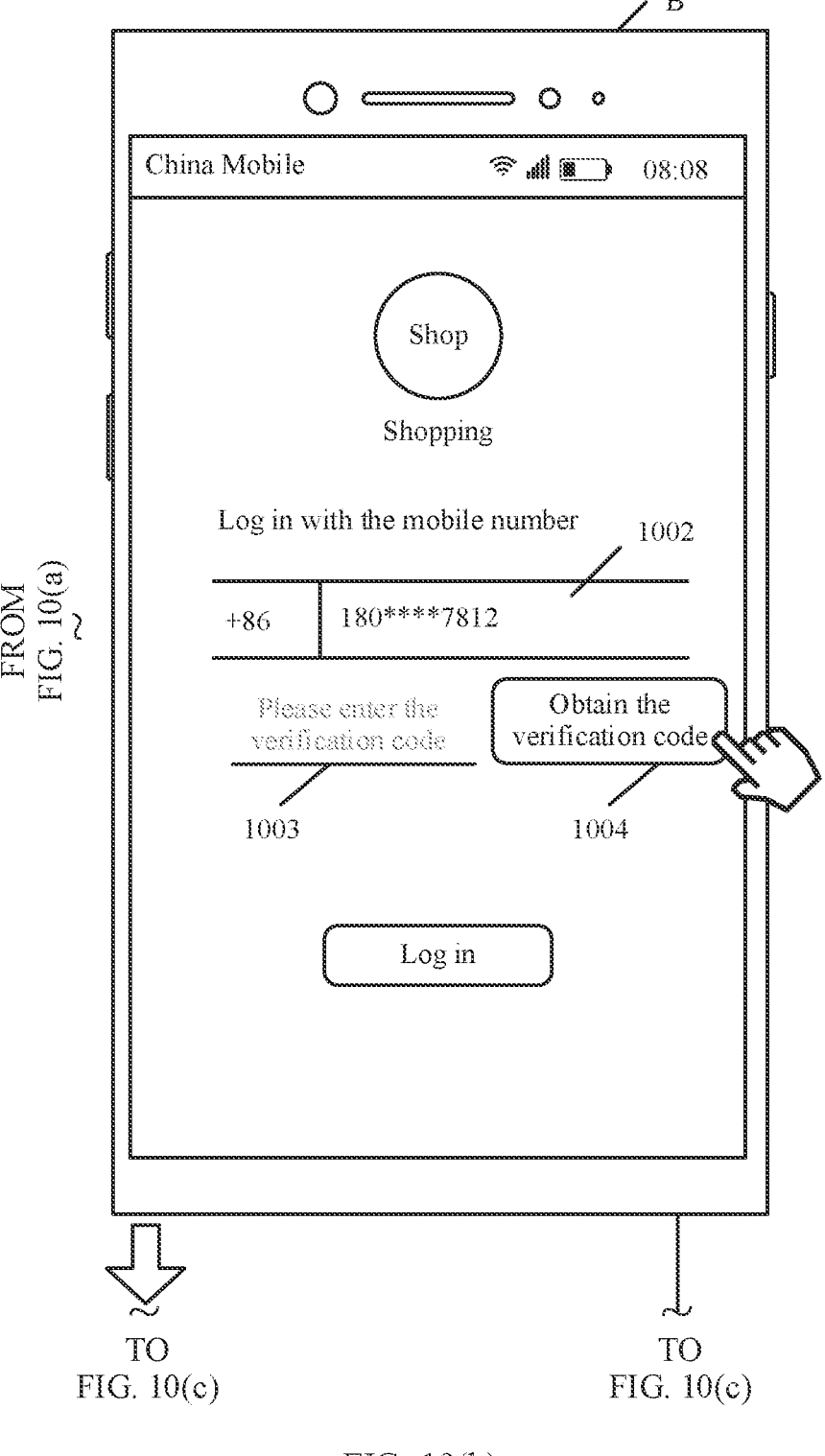

For example, the verification code obtaining operation may be a tap operation performed by the user on the "Obtain the verification code" button 1004 shown in FIG. 10(b). Alternatively, the verification code obtaining operation may be an automatic tap operation performed by the mobile phone B on the "Obtain the verification code" button shown in FIG. 10(b).

S804b: The server receives the verification code obtaining request, and sends a verification code 2 to the mobile phone A (that is, a device using 180****7812).

The verification code 2 is a second verification code. The verification code 2 is a code that the mobile phone B requests the server to deliver to the first account (that is, a device using the first account).

S804c: The mobile phone A receives the verification code 2 from the server.

For a method in which the mobile phone B sends the verification code obtaining request to the server, a method in which the server sends a verification code to the mobile phone A in response to the verification code obtaining request, and a method in which the mobile phone A receives the verification code 2, refer to specific implementations in the conventional technology. Details are not described herein in this embodiment of this application.

S804d: The mobile phone A sends the verification code 2 to the mobile phone B.

The mobile phone A may send the verification code 2 to the mobile phone B through the wireless connection between the mobile phone A and the mobile phone B. In some embodiments, starting from a moment at which the mobile phone A sends the login information of the first account to the mobile phone B, if the mobile phone A receives the verification code 2 from the server within preset duration 2, the mobile phone A may send the verification code 2 to the mobile phone B. If the mobile phone A receives the verification code 2 from the server after the preset duration 2, the mobile phone A does not send the verification code 2 to the mobile phone B. In this case, the mobile phone A may discard the verification code 2.

S804e: The mobile phone B fills the verification code 2 on the account login interface, and logs in to the first account in the first application by using the first account and the verification code 2.

Figure 10C:
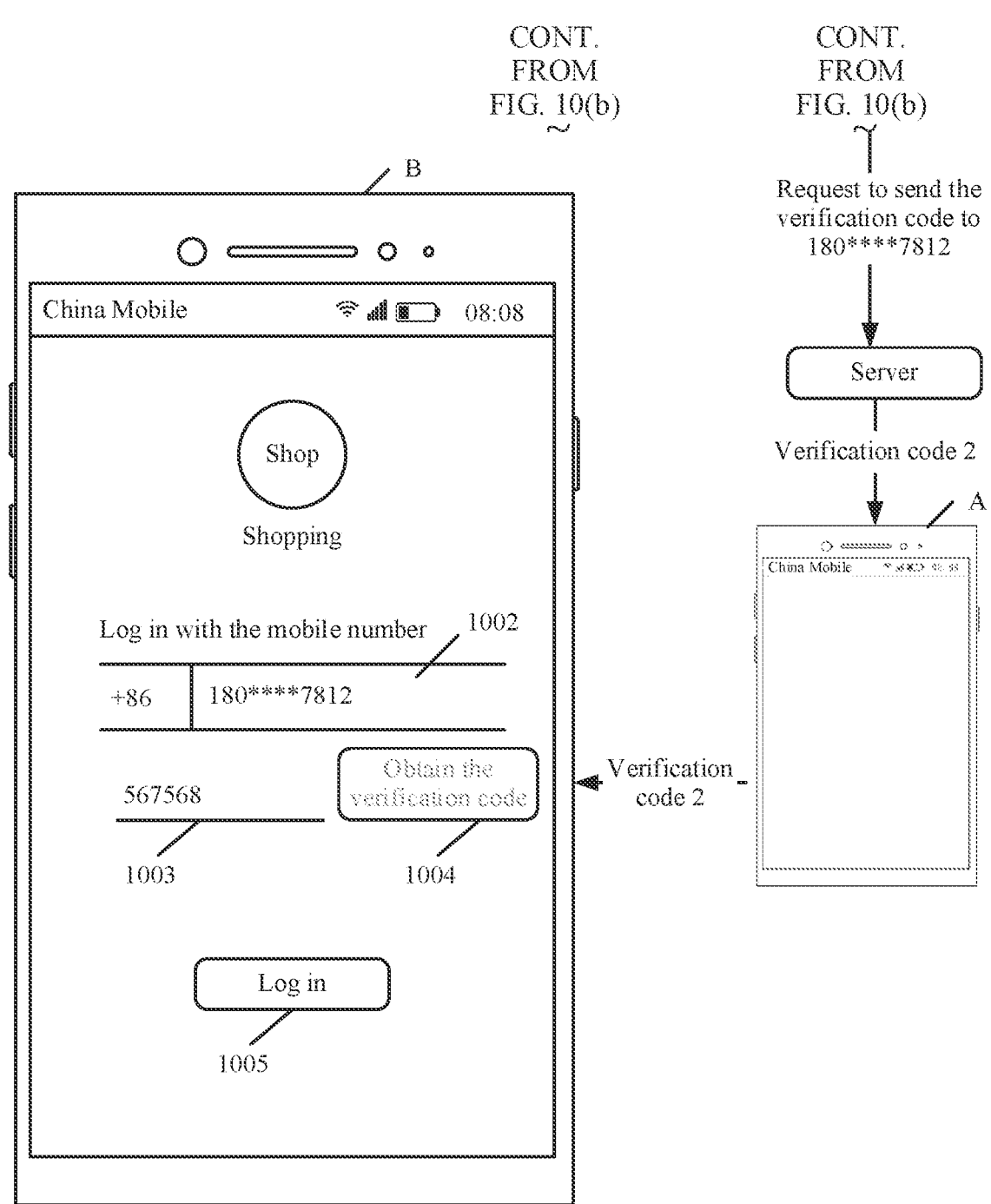

For example, as shown in FIG. 10(c), the mobile phone B may receive the verification code 2 (for example, 567568) from the mobile phone A, and fill the verification code 2 on the account login interface. For a method in which the mobile phone B fills the verification code 2 on the account login interface, refer to the method in which the mobile phone B fills the login password of the first account on the account login interface. Details are not described herein again in this embodiment of this application.

In some embodiments, after the mobile phone B fills the verification code 2 on the account login interface, the mobile phone B may automatically log in to the first account in the first application by using the first account and the verification code 2, in other words, the mobile phone B may automatically trigger a "Log in" button 1005 shown in FIG. 10(c) to log in to the first account in the first application by using the first account and the verification code 2.

In some other embodiments, after the mobile phone B fills the verification code 2 on the account login interface, the mobile phone B may log in, in response to a tap operation performed by the user on the "Log in" button 1005 shown in FIG. 10(c), to the first account in the first application by using the first account and the verification code 2.

In conclusion, the operation 8 (that is, the fourth operation) may include the foregoing verification code obtaining operation (for example, the tap operation performed on the "Obtain the verification code" button 1004 shown in FIG. 10(b)) and the tap operation performed on the "Log in" button 1005 shown in FIG. 10(c).

S805: The mobile phone B discards the identity information of the first application and the login information of the first account, and the account sharing procedure ends.

In some embodiments, if the mobile phone B does not run the first application, the mobile phone B may perform S805. In this embodiment, the mobile phone B does not automatically log in to the first account in the first application based on the login information of the first account.

In some other embodiments, if the mobile phone B does not run the first application, the mobile phone B may determine, based on the identity information of the first application, whether the first application is installed in the mobile phone B. If the first application is installed in the mobile phone B, the mobile phone B may automatically start the first application, and then perform S803 and S804.

According to the account data sharing method provided in embodiment of this application, the mobile phone B may log in to the first account in the first application by using the login information of the first account that is shared by the mobile phone A. In this solution, the login information of the first account can be shared between devices without further developing the client and the server of the application, so that costs of sharing login information between the devices can be reduced.

In addition, the mobile phone A shares login information of an application selected by the user with the mobile phone B, instead of copying login information of all applications in the mobile phone A through cloning. In other words, the method in this embodiment of this application can implement one-time authorized login between devices. In this way, device information security can be improved.

In some embodiments, after obtaining the login information of the first account, the mobile phone B may alternatively save the identity information of the first application and the login information of the first account. After saving the identity information of the first application and the login information of the first account, the mobile phone B may alternatively perform the method steps performed by the mobile phone A in the foregoing procedure (1) to procedure (3), to share the login information of the first account with the another device.

For example, after the mobile phone B obtains the login information of the first account or the mobile phone B logs in to the first account by using the login information of the first account, the mobile phone B may display the second interface, to request the user to confirm whether to save the login information of the first account. The mobile phone B may save the identity information of the first application and the login information of the first account in response to the first operation performed by the user on the second interface. The mobile phone B may delete the identity information of the first application and the login information of the first account in response to the second operation performed by the user on the second interface.

Figure 12A:
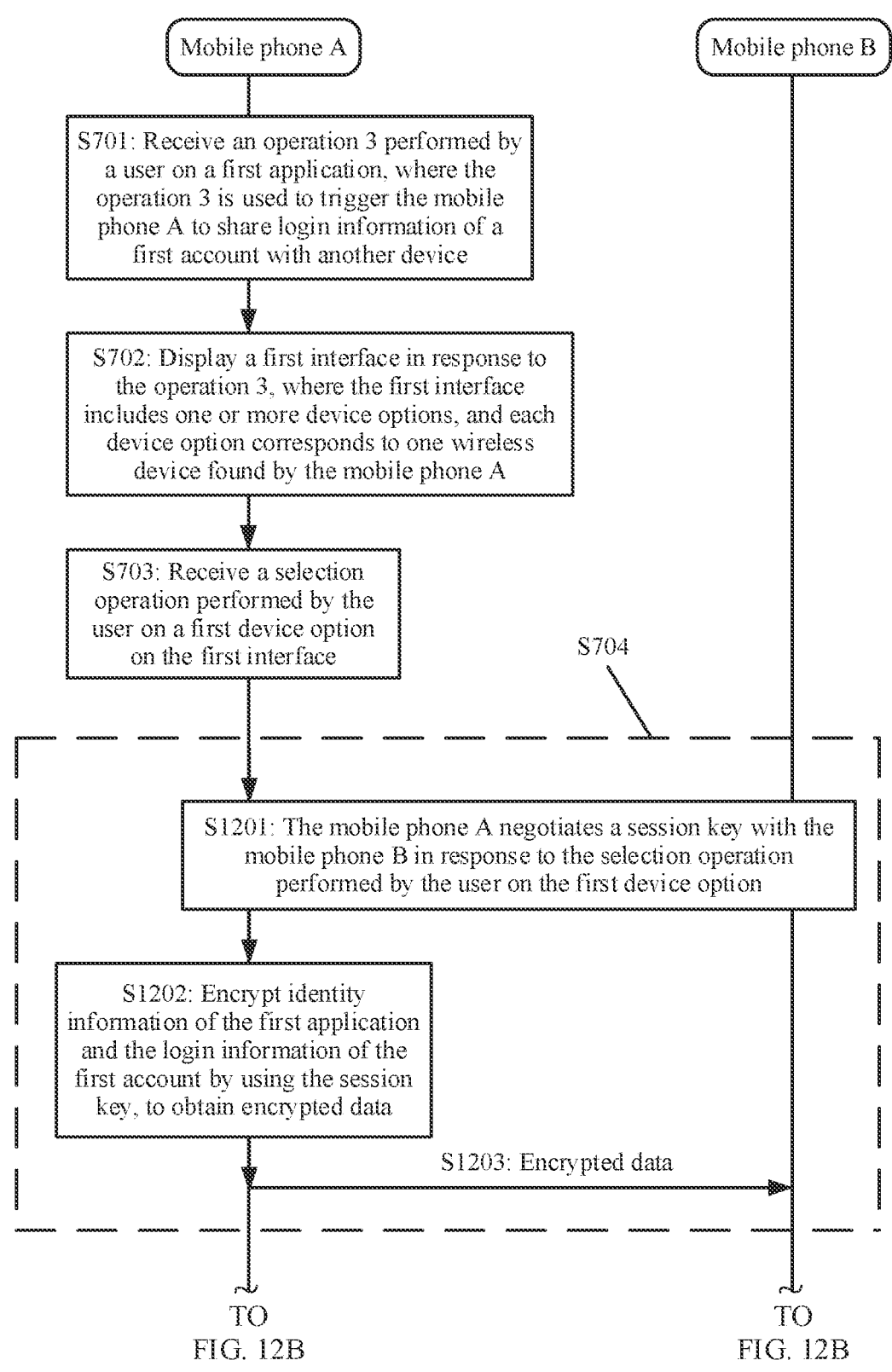
FIG. 12A and FIG. 12B are a flowchart of another account data sharing method according to an embodiment of this application.
Figure 12B:
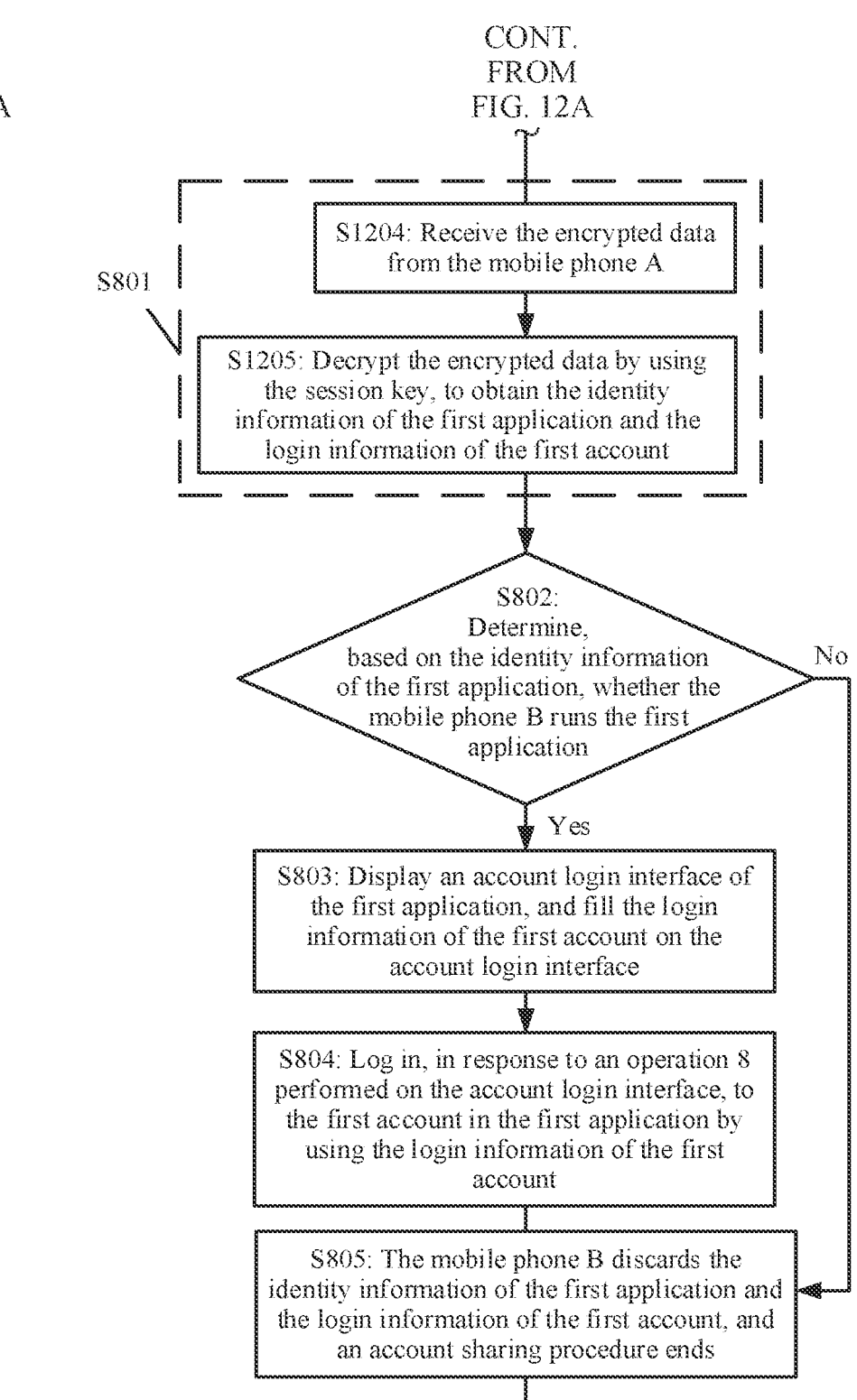

In some other embodiments, to improve security of the login information of the first account and prevent the login information of the first account from being stolen during sharing, the mobile phone A may negotiate a session key with the mobile phone B. The mobile phone A may encrypt, by using the session key, data to be shared with the mobile phone B. Specifically, S704 may be replaced with S1201 to S1203, and S801 may be replaced with S1204 and S1205. For example, as shown in FIG. 12A and FIG. 12B, S704 shown in FIG. 7A-1 and FIG. 7A-2 may be replaced with S1201 to S1203, and S801 may be replaced with S1204 and S1205.

S1201: The mobile phone A negotiates a session key with the mobile phone B in response to the selection operation performed by the user on the first device option.

The mobile phone A may negotiate the session key with the mobile phone B through the wireless connection communication between the mobile phone A and the mobile phone B.

S1202: The mobile phone A encrypts the identity information of the first application and the login information of the first account by using the session key, to obtain encrypted data.

For example, the mobile phone A may encrypt the identity information of the first application and the login information of the first account by using any algorithm such as an advanced encryption standard (Advanced Encryption Standard, AES) encryption algorithm, a Ron Rivest, Adi Shamir. Leonard Adleman (Ron Rivest, Adi Shamir, Leonard Adleman, RSA) encryption algorithm, or an elliptic curve integrated encryption scheme (elliptic curve integrated encryption scheme, ECIES) encryption algorithm and by using the session key, to obtain the encrypted data.

S1203: The mobile phone A sends the encrypted data to the mobile phone B.

S1204: The mobile phone B receives the encrypted data from the mobile phone A.

The encrypted data may be transmitted between the mobile phone A and the mobile phone B through the wireless connection between the mobile phone A and the mobile phone B.

S1205: The mobile phone B decrypts the encrypted data by using the session key, to obtain the identity information of the first application and the login information of the first account.

It should be noted that, for a method in which the mobile phone B decrypts the encrypted data by using the session key, refer to a method for decrypting encrypted data in the conventional technology. Details are not described herein in this embodiment of this application.

In some embodiments, the verification code sent by the mobile phone A to the mobile phone B in S804d may also be a verification code encrypted by using the session key. After receiving the encrypted verification code, the mobile phone B may decrypt the verification code by using the session key.

It may be understood that, because the session key is a key negotiated by the mobile phone A and the mobile phone B, only the mobile phone A and the mobile phone B learn of the session key. The another device does not learn of the session key, and therefore cannot decrypt the encrypted data and cannot obtain the login information of the first account. This can improve information security of sharing login information between devices.

It may be understood that, to implement the foregoing functions, the foregoing electronic device (for example, the mobile phone) includes corresponding hardware structures and/or software modules for performing the functions. A person of ordinary skill in the art may be easily aware that, in combination with the examples described in embodiments disclosed in this specification, units and algorithm steps may be implemented in a form of hardware or a combination of hardware and computer software in embodiments of this application. Whether the functions are performed by hardware or computer software driving hardware depends on particular applications and design constraints of the technical solutions. A person skilled in the art may use different methods to implement the described functions for each particular application, but it should not be considered that the implementation goes beyond the scope of embodiments of this application.

In embodiments of this application, the foregoing electronic device (for example, a mobile phone) may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely logical function division. During actual implementation, another division manner may be used.

Figure 13:
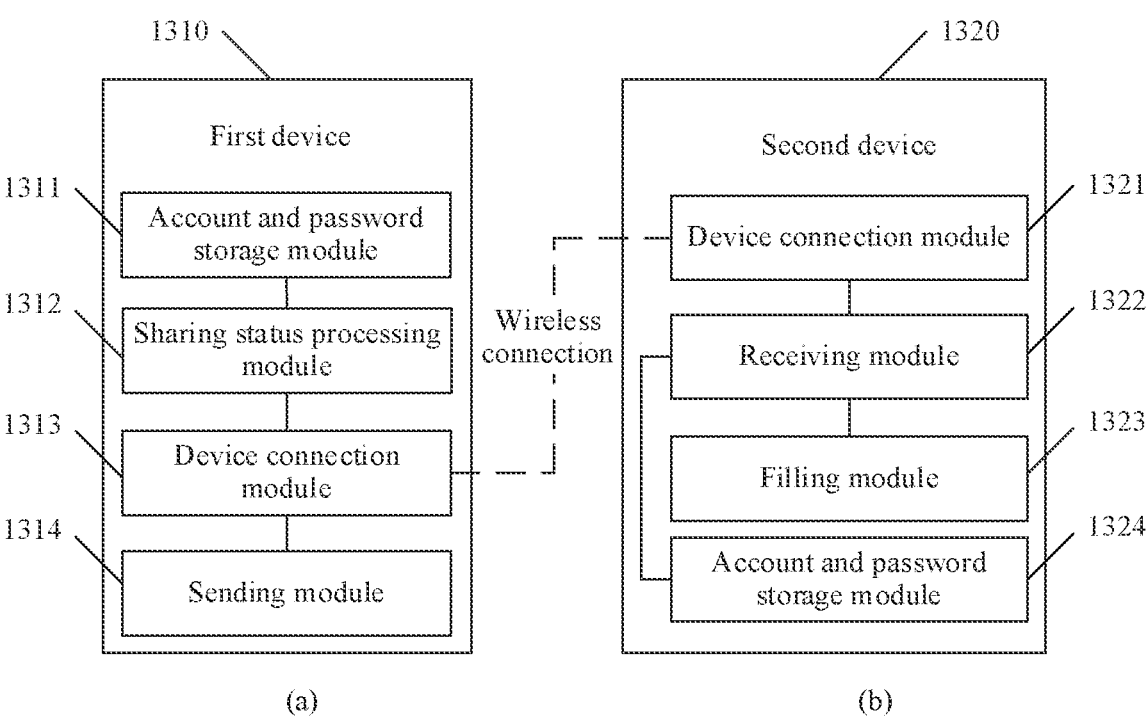
FIG. 13 is a schematic diagram of a structure of an electronic device according to an embodiment of this application.

In FIG. 13, (a) is a schematic diagram of a possible structure of the first device (for example, the mobile phone A) in the foregoing embodiment. In FIG. 13, (b) is a schematic diagram of a possible structure of the second device (for example, the mobile phone B) in the foregoing embodiment. As shown in (a) in FIG. 13, the first device 1310 may include an account and password storage module 1311, a sharing status processing module 1312, a device connection module 1313, and a sending module 1314. As shown in (b) in FIG. 13, the second device 1320 may include a device connection module 1321, a receiving module 1322, a filling module 1323, and an account and password storage module 1324.

The account and password storage module 1311 is configured to store an account that is logged in to in an application installed in the first device 1310 and a login password of the account. For example, the account and password storage module 1311 is configured to support the first device 1310 in performing S304 in the foregoing instance, and/or is configured to perform another process of the technology described in this specification.

The sharing status processing module 1312 is configured to trigger the first device 1310 to share login information of a first account with another device. Specifically, the sharing status processing module 1312 may trigger the first device 1310 to establish a wireless connection to the another device, and share the login information of the first account with the another device through the wireless connection. For example, the sharing status processing module 1312 is configured to support the first device 1310 in performing S701, S702, and S703 in the foregoing instance, and/or is configured to perform another process of the technology described in this specification.

The device connection module 1313 is configured to support the first device 1310 in establishing a wireless connection to the another device. For example, the device connection module 1313 may interact with the device connection module 1321 of the second device 1320, so that the first device 1310 establishes a wireless connection to the second device 1320.

The sending module 1314 is configured to send the login information of the first account to the another device. For example, the sending module 1314 is configured to support the first device 1310 in performing S704 in the foregoing instance, and/or is configured to perform another process of the technology described in this specification.

Optionally, the first device 1310 may further include an account login module. For example, the account login module is configured to support the first device 1310 in performing S301 and S302, and/or is configured to perform another process of the technology described in this specification.

The device connection module 1321 is configured to support the second device 1320 in establishing a wireless connection to the another device. For example, the device connection module 1321 may interact with the device connection module 1313 of the first device 1310, so that the second device 1320 establishes a wireless connection to the first device 1310.

The receiving module 1322 is configured to receive the login information of the first account from the first device 1310. For example, the receiving module 1322 is configured to support the second device 1320 in performing S801 in the foregoing instance, and/or is configured to perform another process of the technology described in this specification.

The filling module 1323 is configured to fill, on an account login interface, the login information of the first account that is received by the receiving module 1322. For example, the filling module 1323 is configured to support the second device 1320 in performing S803 and S804e of filling a verification code in the foregoing instance, and/or is configured to perform another process of the technology described in this specification.

The account and password storage module 1324 is configured to store an account that is logged in to in an application installed in the second device 1320 and a login password of the account. For example, the account and password storage module 1324 is configured to support the second device 1320 in storing the login information of the first account from the first device 1310.

Optionally, the second device 1320 may further include an account login module. For example, the account login module is configured to support the second device 1320 in performing S804, and/or is configured to perform another process of the technology described in this specification.

When an integrated unit is used, in the first device 1310, a function of the sharing status processing module 1312 may be integrated into a processing module for implementation, functions of the device connection module 1313 and the sending module 1314 may be integrated into a communications module for implementation, and a function of the account and password storage module 1311 may be integrated into a storage module for implementation. In the second device 1320, functions of the device connection module 1321 and the receiving module 1322 may be integrated into a communications module for implementation, a function of the filling module 1323 may be integrated into a processing module for implementation, and a function of the account and password storage module 1324 may be integrated into a storage module for implementation. Certainly, the unit modules of each of the first device 1310 and the second device 1320 include but are not limited to the processing module, the storage module, and the wireless communications module. For example, the first device 1310 and the second device 1320 each may further include a display module.

For example, the processing module may be one or more processors (for example, the processor 210 shown in FIG. 2), and the communications module includes a wireless communications module (for example, the wireless communications module 260 shown in FIG. 2). The wireless communications module may be referred to as a communications interface. The storage module may be a memory (for example, the internal memory 221 shown in FIG. 2). The display module may be a display (for example, the display 294 shown in FIG. 2). The one or more processors, the memory, the display, and the like may be connected together, for example, through a bus. The memory may be configured to store computer program code. The computer program code includes computer instructions. When the processor executes the computer instructions, the electronic device may perform the functions or steps performed by the mobile phone in the foregoing method embodiments. For a structure of the electronic device, refer to the structure of the electronic device 200 shown in FIG. 2.

Figure 14:
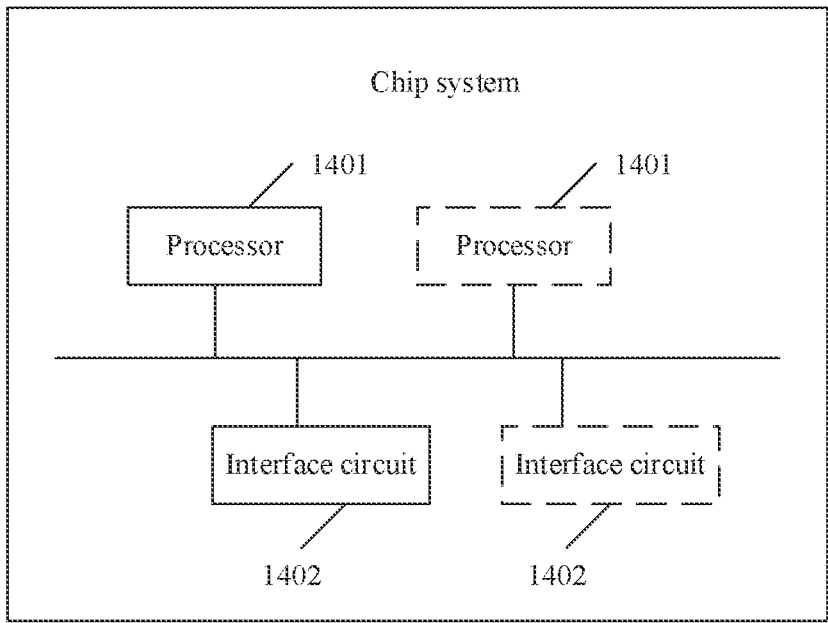
FIG. 14 is a schematic diagram of a structure of a chip system according to an embodiment of this application.

An embodiment of this application further provides a chip system. As shown in FIG. 14, the chip system includes at least one processor 1401 and at least one interface circuit 1402. The processor 1401 and the interface circuit 1402 may be connected to each other through a line. For example, the interface circuit 1402 may be configured to receive a signal from another apparatus (for example, a memory of an electronic device). For another example, the interface circuit 1402 may be configured to send a signal to another apparatus (for example, the processor 1401). For example, the interface circuit 1402 may read instructions stored in the memory, and send the instructions to the processor 1401. When the instructions are executed by the processor 1401, the electronic device (for example, the electronic device 200 shown in FIG. 2) may be enabled to perform the steps in the foregoing embodiments. Certainly, the chip system may further include another discrete device. This is not specifically limited in this embodiment of this application.

An embodiment of this application further provides a computer storage medium. The computer storage medium includes computer instructions. When the computer instructions are run on the foregoing electronic device (for example, the electronic device 200 shown in FIG. 2), the electronic device is enabled to perform the functions or steps performed by the mobile phone in the foregoing method embodiments.

An embodiment of this application further provides a computer program product. When the computer program product runs on a computer, the computer is enabled to perform the functions or steps performed by the mobile phone in the foregoing method embodiments.

Based on the descriptions of the foregoing implementations, a person skilled in the art may clearly understand that, for ease and brevity of description, division into the foregoing function modules is merely used as an example for description. During actual application, the foregoing functions may be allocated to different function modules according to a requirement, in other words, an internal structure of the apparatus is divided into different function modules, to implement all or some of the functions described above.

In several embodiments provided in this application, it should be understood that the disclosed apparatuses and methods may be implemented in another manner. For example, the foregoing apparatus embodiments are merely examples. For example, division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units, in other words, may be located in one place, or may be distributed at a plurality of different places. Some or all of the units may be selected according to actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium, and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a system, wherein the method comprises:

starting, by a second electronic device of the system, a first application;

displaying, by the second electronic device, a first application interface comprising an account input box, a verification code input box, and a verification code obtaining control;

receiving, by the second electronic device, a first operation that enters account information in the account input box;

receiving, by the second electronic device, a second operation for the verification code obtaining control;

receiving, by a first electronic device of the system and in response to the second operation, a first verification code;

skipping sending, by the first electronic device, the first verification code to the second electronic device in response to receiving the first verification code after a preset duration;

receiving, by the first electronic device and in response to a third operation, a second verification code;

sending, by the first electronic device, the second verification code to the second electronic device in response to receiving the second verification code within the preset duration;

filling, by the second electronic device, the second verification code into the verification code input box; and logging in, by the second electronic device after filling the second verification code, to the first application using the account information and the second verification code.

2. The method of claim 1, wherein receiving the second verification code comprises:

sending, by the second electronic device in response to the third operation, a verification code obtaining request to a server of the first application;

sending, by the server, the second verification code to the first electronic device according to the verification code obtaining request; and receiving, by the first electronic device from the server, the second verification code.

3. The method of claim 1, further comprising sending the second verification code to the second electronic device over a wireless connection.

4. The method of claim 1, further comprising:

encrypting the second verification code on the first electronic device before sending to the second electronic device; and decrypting the second verification code on the second electronic device to extract the second verification code.

5. The method of claim 1, wherein the first application interface further comprises a login control, and wherein logging in to the first application after filling the verification code comprises:

receiving, by the second electronic device, a fourth operation for the login control; and logging in, by the second electronic device in response to the fourth operation, to the first application using the account information and the second verification code.

6. The method of claim 1, wherein the account information comprises a phone number of the first electronic device.

7. The method of claim 1, wherein the account information comprises an email address of the first electronic device.

8. A system comprising:

a second electronic device, configured to:

start a first application;

display a first application interface comprising an account input box, a verification code input box, and a verification code obtaining control;

receive a first operation that enters account information in the account input box; and receive a second operation for the verification code obtaining control; and a first electronic device, configured to:

receive, in response to the second operation, a first verification code;

skip sending the first verification code to the second electronic device in response to receiving the first verification code after a preset duration;

receive, in response to a third operation, a second verification code; and send the second verification code to the second electronic device in response to receiving the second verification code within the preset duration, wherein the second electronic device is further configured to:

fill the second verification code into the verification code input box; and log in, after filling the second verification code, to the first application using the account information and the second verification code.

9. The system of claim 8, wherein the system further comprises a server, wherein the second electronic device is further configured to send, in response to the third operation, a verification code obtaining request to the server of the first application, wherein the server is configured to send the second verification code to the first electronic device according to the verification code obtaining request, and wherein the first electronic device is further configured to receive, from the server, the second verification code.

10. The system of claim 8, wherein the first electronic device is further configured to send the second verification code to the second electronic device over a wireless connection.

11. The system of claim 8, wherein the first electronic device is further configured to encrypt the second verification code before sending to the second electronic device, and wherein the second electronic device is further configured to decrypt the second verification code to extract the second verification code.

12. The system of claim 8, wherein the first application interface further comprises a login control, and wherein the wherein the second electronic device is further configured to:

receive a fourth operation for the login control; and log in, in response to the fourth operation, to the first application using the account information and the second verification code.

13. The system of claim 8, wherein the account information comprises a phone number of the first electronic device.

14. The system of claim 8, wherein the account information comprises an email address of the first electronic device.

\* \* \* \* \*